United States Patent
Castro et al.

(10) Patent No.: US 8,899,384 B2
(45) Date of Patent: Dec. 2, 2014

(54) ELECTRONIC BRAKE ASSEMBLY FOR A BICYCLE

(75) Inventors: Ursi Castro, Jacksonville, FL (US); Christopher Miller, Bronxville, NY (US); Paul Dowd, Scarsdale, NY (US)

(73) Assignee: Turtle Brake, Inc., Jacksonville, FL (US)

( * ) Notice: Subject to any disclaimer, the term of this patent is extended or adjusted under 35 U.S.C. 154(b) by 463 days.

(21) Appl. No.: 13/198,912

(22) Filed: Aug. 5, 2011

(65) Prior Publication Data

US 2012/0024639 A1 Feb. 2, 2012

Related U.S. Application Data

(63) Continuation-in-part of application No. 12/633,206, filed on Dec. 8, 2009, now Pat. No. 8,485,321.

(60) Provisional application No. 61/121,470, filed on Dec. 10, 2008.

(51) Int. Cl.
*B62L 3/00* (2006.01)

(52) U.S. Cl.
USPC ............. 188/24.22; 188/72.8; 188/1.11 R

(58) Field of Classification Search
CPC .......... F16D 2121/24; F16D 2066/003; F16D 2125/40
USPC ............. 188/24.11–27, 72.8, 1.11 R
See application file for complete search history.

(56) References Cited

U.S. PATENT DOCUMENTS

| | | | |
|---|---|---|---|
| 4,263,990 A | 4/1981 | Yoshigai | |
| 4,765,443 A | 8/1988 | Cunningham | |
| 5,620,077 A * | 4/1997 | Richard | 192/12 D |
| 5,803,211 A * | 9/1998 | Wilke | 188/173 |
| 5,816,352 A | 10/1998 | Hacker | |
| 5,924,507 A | 7/1999 | Prather | |
| 6,666,305 B1 * | 12/2003 | Vohla | 188/58 |
| 6,722,477 B1 * | 4/2004 | Wolfsteiner et al. | 188/72.9 |
| 7,549,356 B2 | 6/2009 | Leuschke et al. | |
| 2002/0134604 A1 | 9/2002 | Lan | |
| 2008/0114519 A1 | 5/2008 | DuFaux et al. | |
| 2009/0078512 A1 | 3/2009 | Edwards et al. | |
| 2010/0170753 A1 | 7/2010 | Castro | |
| 2010/0194187 A1 | 8/2010 | Howard | |

FOREIGN PATENT DOCUMENTS

| | | |
|---|---|---|
| DE | 19537394 | 8/1996 |
| GB | 2453106 | 4/2009 |
| JP | 60-056691 | 4/1985 |

(Continued)

*Primary Examiner* — Xuan Lan Nguyen

(74) *Attorney, Agent, or Firm* — Leason Ellis LLP

(57) ABSTRACT

An electronic brake device for use with a wheel of a bicycle provides, among other features, wireless, remote disengagement of a wheel brake. A brake coupled to a housing is movable between an engaged position and a disengaged position. The housing includes a receiver configured to receive a command signal, and a processor operative to identify the received command signal. If the command signal is identified as a first command signal, the processor outputs a first control signal. An electric motor is operatively coupled to the brake to selectively move the brake from the engaged position in which the wheel of the bicycle is being braked to the disengaged position in which the wheel of the bicycle is free of any brake contact in response to the first control signal. Measured movement of the brakes between fully braked or fully disengaged positions are possible in the disclosed arrangement.

16 Claims, 25 Drawing Sheets

(56) References Cited

FOREIGN PATENT DOCUMENTS

| | | |
|---|---|---|
| JP | 08-140212 | 5/1996 |
| JP | 2006082740 | 3/2006 |
| JP | 2008-168751 | 7/2008 |
| WO | WO 2004/075456 | 9/2004 |

* cited by examiner

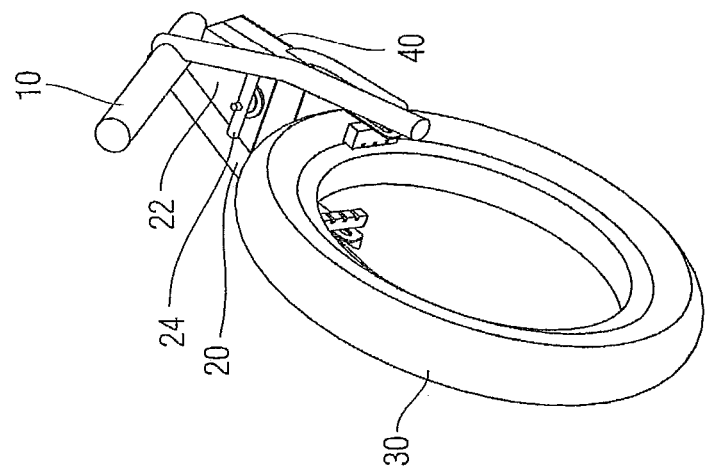
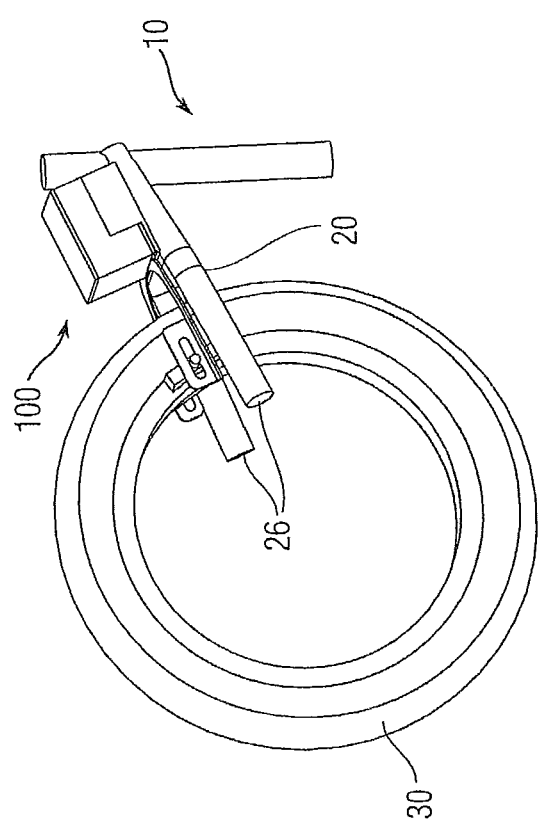

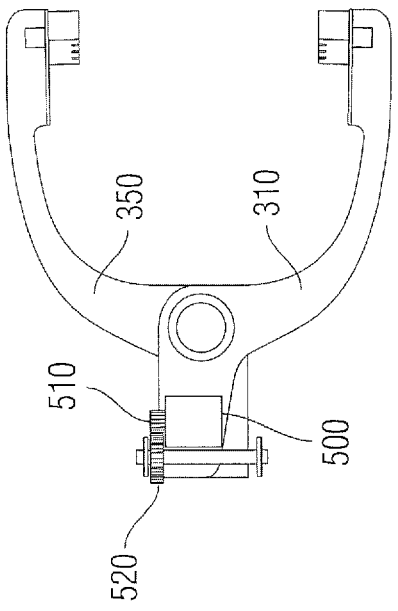
Fig. 7
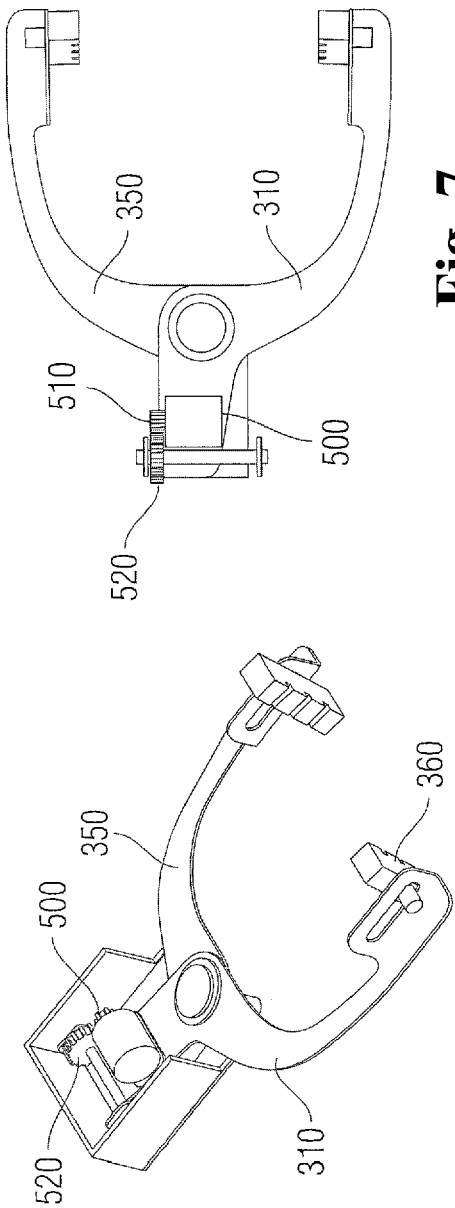
Fig. 6
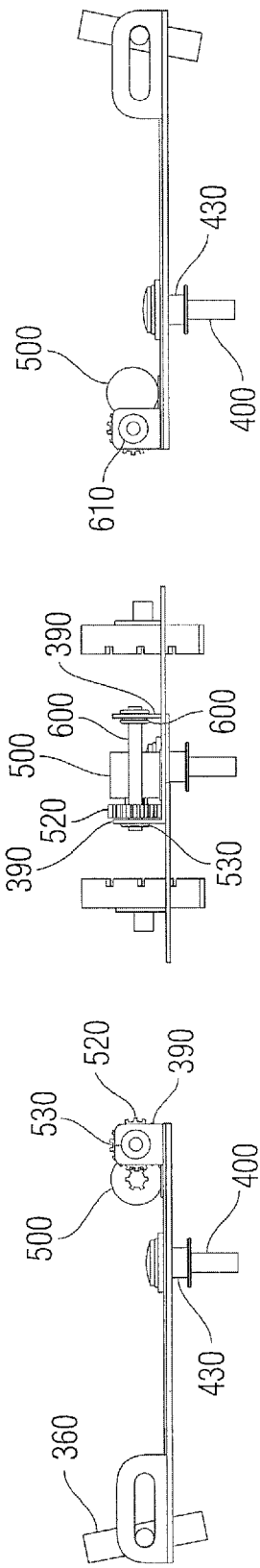
Fig. 9
Fig. 8B
Fig. 8A

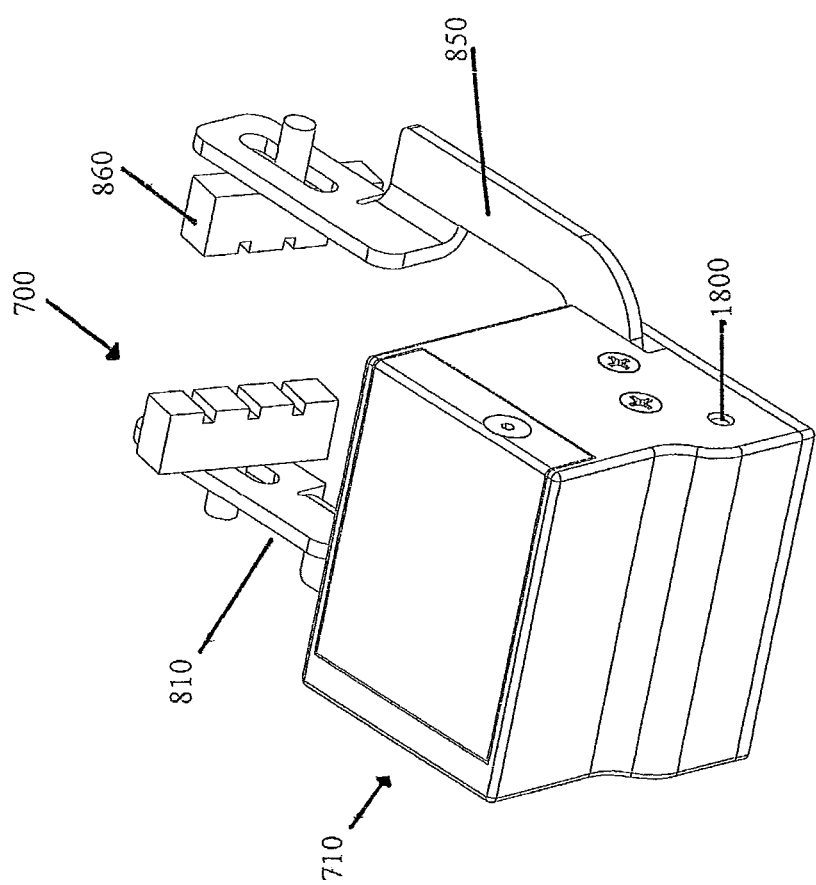

BRAKE ON

BRAKE OFF

ELECTRONIC BRAKE ASSEMBLY FOR A BICYCLE

CROSS REFERENCE TO RELATED APPLICATIONS

The present application is a continuation-in-part of U.S. patent application Ser. No. 12/633,206, filed Dec. 8, 2009 now U.S. Pat. No. 8,485,321, which claims the benefit to U.S. Patent Application Ser. No. 61/121,470, filed Dec. 10, 2008, each of which is hereby incorporated by reference in its entirety.

TECHNICAL FIELD OF THE INVENTION

The present invention relates to brake devices and in particular, to a remote control brake that can be easily attached to a child's bicycle to allow a parent to monitor the child and use a remote control to apply the rear brake to stop the bicycle remotely and safely in the event that the child fails to see a hazard or fails to obey the commands of the parent, is not in control of the bicycle, or has bicycled too far away from the parent.

BACKGROUND OF THE INVENTION

One traditional toy that is enjoyed by not only children but also adults is a bicycle. There are a number of different types of bicycles that are designed for young children to assist them in learning how to ride a bicycle. Two of the more common bicycles are a bicycle equipped with training wheels and a bicycle equipped with a coaster type brake. Most times, a child's first true bicycle is of a coaster brake type that includes training wheels to assist the child in learning how to ride the bicycle. Training wheels, which are also known as stabilizers, are an additional wheel or wheels mounted parallel to the rear wheel of a bicycle that assists learners until they have developed a usable sense of balance of the bicycle. A coaster brake, which can also be referred to as a back pedal brake, is a type of drum brake which is integrated into hubs having an internal freewheel. Freewheeling functions as with other systems, but, when back pedaled, the bake engages after a fraction of a revolution. The bicycle is stopped by the child back pedaling, thereby causing the brake to be applied.

Even though coaster brakes can be effective in stopping the bicycle, there are a number of concerns that parents have when a child uses such beginning bicycles and in particular, when a child is first learning to ride a bicycle. First, the child may get confused or scared and simply forget how to apply the coaster brake in which case the child is essentially riding on a runaway bicycle. Second, a child may not appreciate or fail to recognize a particular hazard, such as a car approaching, and thus is unaware that the brake must be applied in order to avert such dangerous situation. Third, when going down a slight decline, the child may get scared as the bicycle picks up speed and is simply overcome with fear and unable to apply the brake in a controlled manner. Countless other hazards potentially face a child beginning to learn how to ride a bicycle.

As a result, the learning of how to ride a bicycle can be not only potential dangerous for a child but also very unnerving for the parent. There is therefore a need for a device that can allow a parent better control over a child who is learning to ride a bicycle.

SUMMARY OF THE INVENTION

In accordance with one aspect of the invention, an electronic brake device for use with a wheel of a bicycle provides, among other features, wireless, remote disengagement of a wheel brake.

In one embodiment, an electronic brake device for use with a wheel of a bicycle includes a housing; a first brake caliper having a first end and a second end that contains a brake pad; and a second brake caliper having a first end and second end that contains a brake pad. The first and second brake calipers are pivotally coupled to one another about a main pivot that is a fixed pivot. The device includes an electric motor disposed within the housing and being mounted to the first brake caliper. A first gear is driven by the electric motor and the device further includes a gear mechanism that is intimately coupled to the first gear and includes a plurality of gears that are driven by movement of the first gear.

A pivot arm assembly is coupled to the main pivot and to a secondary movable pivot that is operatively coupled to the gear mechanism such that operation of the gear mechanism causes the secondary pivot to move. The pivot arm assembly has a biasing mechanism which applies a force to at least one component of the pivot arm assembly to cause movement thereof depending upon the location of the secondary pivot. The movement of the at least one component is translated into movement of the calipers between a brake on position in which the brake pads are in contact with the tire to prevent movement thereof and a brake off position in which the brake pads are spaced from the tire to allow movement thereof. A circuit is configured to receive a remote command signal and activate the electric motor.

The device is configured to provide an over-centered spring mechanism to cause movement of the calipers between a brake on and a brake off position as a result of the pivot arm assembly being assisted by the over-centered spring mechanism to cause the pivot arm assembly to maintain one of a brake on position and a brake off position.

These and other aspects, features and advantages shall be apparent from the accompanying Drawings and description of certain embodiments of the invention.

BRIEF DESCRIPTION OF THE DRAWINGS

FIG. 2A is a side perspective view of the device of FIG. 1 installed on a rear tire of a bicycle;

FIG. 2B is a side perspective view of the device of FIG. 1 installed on the rear tire;

FIG. 6 is a perspective view of the assembly and compartment of FIG. 5 in an assembled condition;

FIG. 7 is a top plan view of the caliper assembly in an assembled condition;

FIG. 8A is a right side elevation view of the assembly of FIG. 7;

FIG. 8B is an end view of the assembly of FIG. 7;

FIG. 9 is a left side elevation view of the assembly of FIG. 7;

FIG. 10 is a perspective view of a remote control brake device according to one embodiment for a bicycle;

DETAILED DESCRIPTION OF CERTAIN EMBODIMENTS OF THE INVENTION

Figure 1:
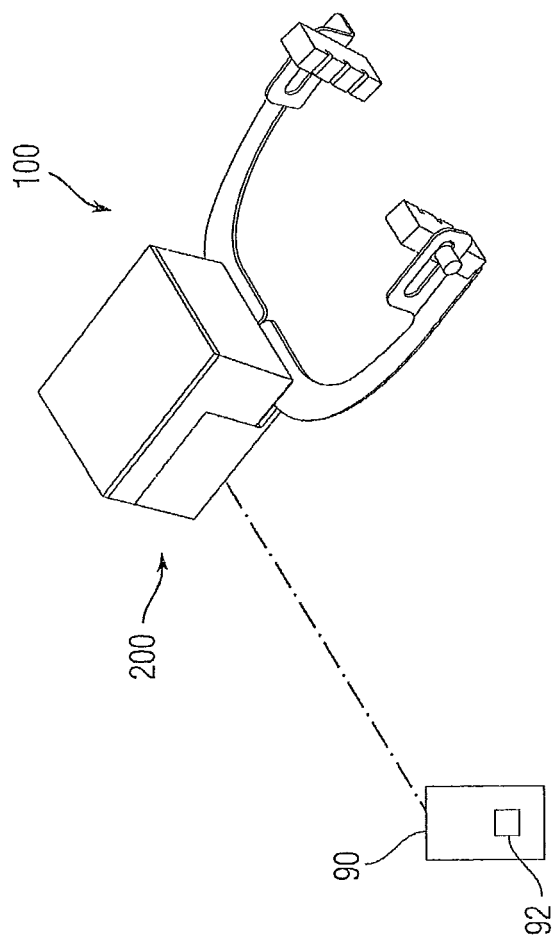
FIG. 1 is a top and side perspective view of a remote control brake device according to one embodiment for a bicycle.

FIG. 1 illustrates a remote control (electronic) brake device 100 for use with a bicycle, especially a child's bicycle. FIGS. 2A and 2B illustrate the brake device 100 mounted on a frame 10 of a bicycle. The frame 10 includes a rear fork 20 that defines a space 22 that receives a portion of a tire 30 and therefore, the rear fork 20 at least partially surrounds the tire 30. It will be appreciated that a number of components of the frame 10, as well as other components, are not illustrated for ease of illustration.

Typically, the rear fork 20 includes a cross member 24 that extends between the arms 26 of the rear fork 20. The cross member 24 and the arms 26 are often tubular metal pieces that are attached to one another, e.g., by welding. It is standard for the cross member 24 to have an opening or bore 40 formed therethrough to allow for subsequent installation of a conventional brake device that is actuated at the handlebars of the bicycle. Conveniently, the brake device 100 can be mounted to the cross member 24 to position the brake device 100 relative to the tire 30 to permit controlled braking and stopping of the tire 30. A fastener, such as a bolt, can be used to mount the brake device 100 by disposing the fastener through the bore 40 and a nut or the like can be used to fasten the brake device 100 to the frame 10. Alternatively, the bore 40 can be a threaded bore and the fastener threadingly engages the cross member 24.

Figure 3:
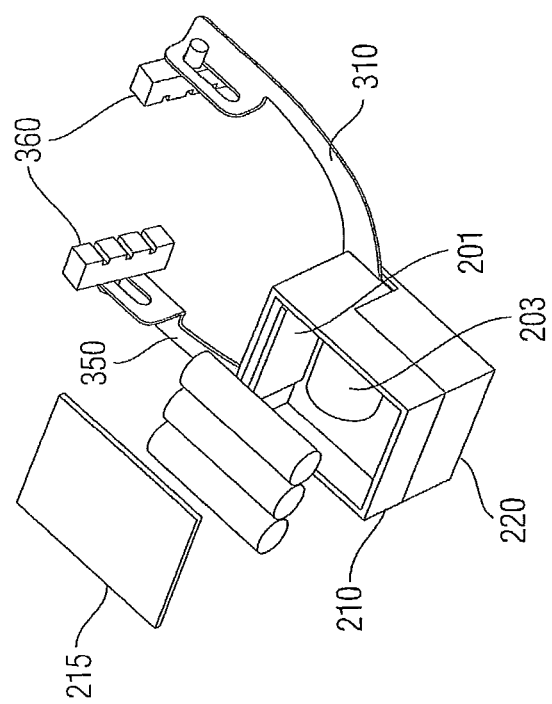
FIG. 3 is an exploded top perspective view of the device of FIG. 1 illustrating a compartment for holding a power source.
Figure 5A:
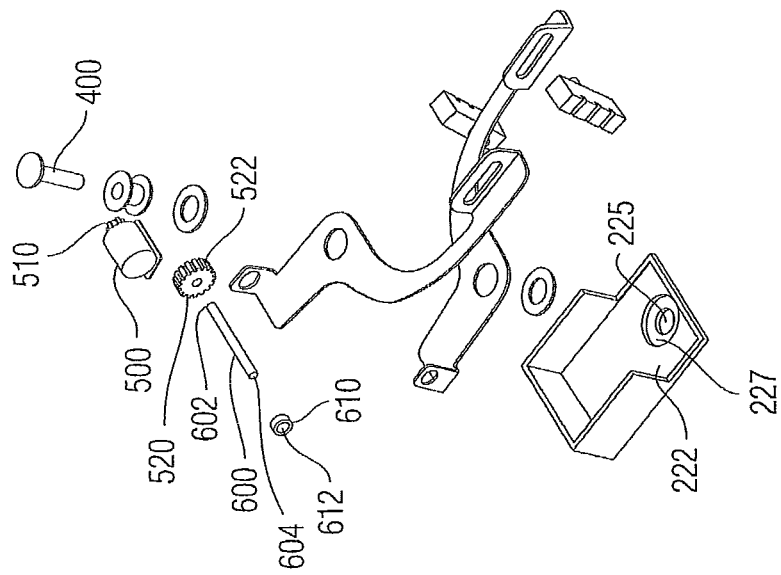
FIG. 5A is another exploded perspective view of the caliper assembly.
Figure 5:
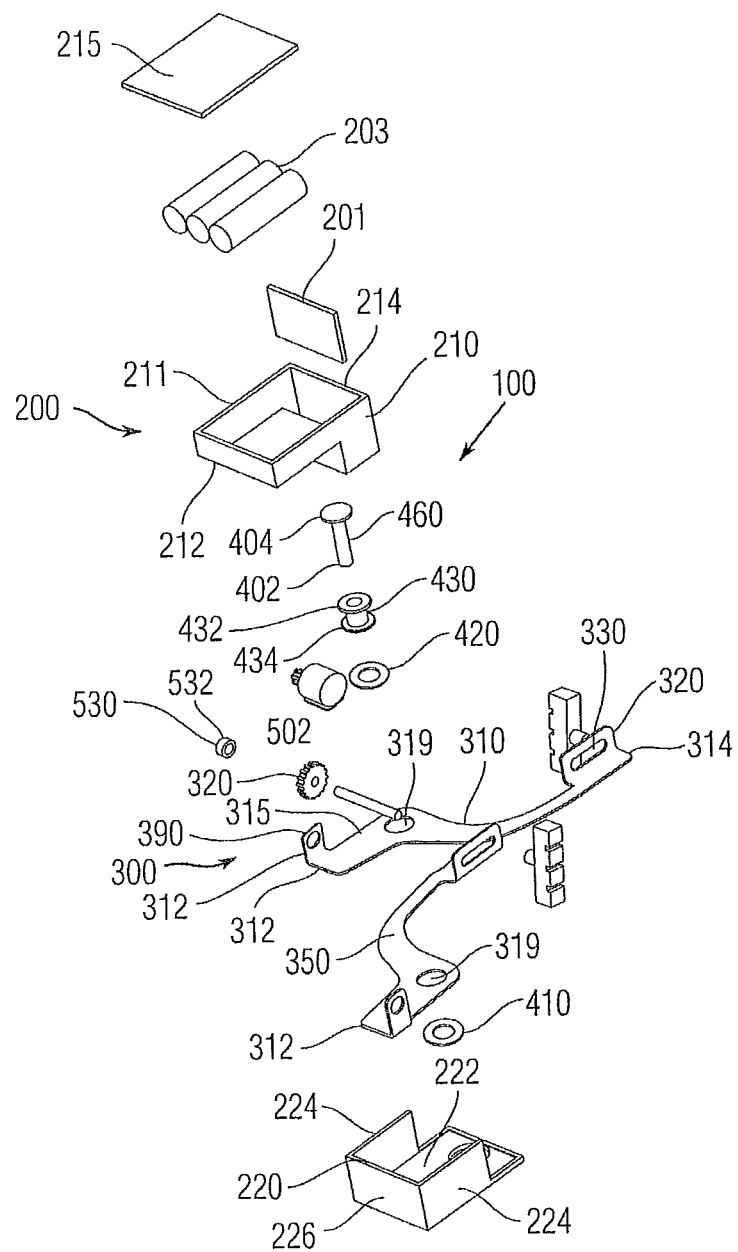
FIG. 5 is an exploded perspective view of the caliper assembly and power source compartment.

FIGS. 3 and 5 and 5A illustrate components of the brake device 100 and in particular, the brake device 100 includes a housing 200 that stores a power source 203 such as batteries or a rechargeable fuel cell in a battery receptacle, with the power source electrically connected to circuitry configured to implement remote, wireless braking of the wheel of a bicycle. The housing also includes an electronically actuated caliper brake assembly 300. The housing 200 includes a first part 210 and a complementary second part 220. The first part 210 can be thought of as a top part, while the second part 220 can be thought of as a bottom part. The first part 210 is a substantially hollow member that defines an inner compartment 211 for holding the power source 203. The inner compartment 211 includes a first section 212 and an adjacent second section 214. The second section 214 has a greater depth than the first section 212. As shown in FIG. 5, the first part 210 generally has an L shape with the first section 212 representing the larger section and the second section 214 representing the smaller section.

The second part 220 is complementary to the first part 210 and includes a base or floor 222 that is at least partially surrounded by a pair of side walls 224 and an end wall 226. The end wall 226 is located at one end of the floor 222 and the side walls 224 attach at ends to the end wall 226 and terminate prior to the other end of the floor 222 such that the floor 222 is open along one end thereof. The floor 222 includes an opening 225 formed therethrough in the region where the side walls 224 are absent. The opening 225 is surrounded by a circular shaped recess 227 that is formed in the floor 222 such that the opening 225 is formed in the middle thereof. The length of the side walls 224 is selected so that when the first and second parts 210, 220 are mated together, the second section 214 fits in the region where the side walls 224 are absent. The underside of the first section 212 seats against the top edges of the side walls 224.

As best shown in FIG. 5, the power source 203 can be in the form of a plurality of batteries that are disposed in the first section 212 and extend across a top portion of the second section 214. The batteries 210 are thus contained within the inner compartment 211. The brake device 100 also includes circuitry including a receiver, a processor, and supportive components such as a signal amplifier, latch, capacitor and/or inductor, in order to provide control signals to the electric motor in connection with actuation of the motor to fully or partially engage the brake, or to disengage the brake. A printed circuit board (PCB) 201 disposed within the first part 210 supports some or all of these components. In FIG. 5, the PCB 201 is a square or rectangular shaped member that is disposed within the second section 214 of the first part 210. The power source 203 is operatively (electrically) connected to the PCB 201 and provides current and voltage to the remaining circuitry. A top cover 215 is used to close off the inner compartment 211 and can be attached to the first part 210 using conventional techniques. FIG. 3 shows the PCB 201 inserted into the second section 214 of the first part 210 and the batteries 210 are positioned for placement in the inner compartment 211.

Figure 4:
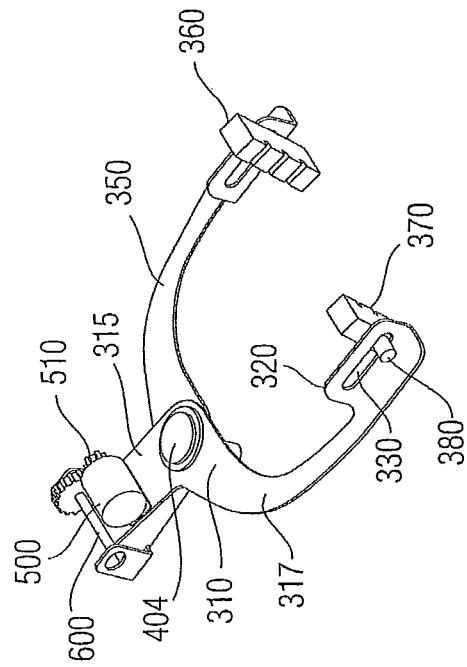
FIG. 4 is a top and side perspective view of a remote controllable caliper assembly of the brake device.

FIGS. 4 and 5 illustrate the caliper brake assembly 300 in more detail. The caliper brake assembly 300 includes a number of components that interact and are coupled to one another. The caliper brake assembly 300 includes a first brake caliper 310 and a second brake caliper 350 that can be a mirror image thereof as shown. The first brake caliper 310 includes a first end 312 and an opposing second end 314. The first brake caliper 310 has a base section 315 that terminates at the first end 312 and a bent or curved section 317 that terminates at the second end 314. At or near the location where the base section 315 merges with the curved section 317, an opening 319 is formed through the first brake caliper 310 and represents a pivot point for the first and second brake calipers 310, 350. The opening 319 can have a circular shape.

At the second end 314, an upstanding first flange 320 is formed. The flange 320 includes a slot 330, such as a longitudinal slot. The first flange 320 can be formed perpendicular to the base section 315.

The first and second calipers 310, 350 can be formed of a number of different materials, including metals or other materials.

A brake pad 360 is provided and is intimately inserted into and held within the slot 330. The brake pad 360 can be a conventional brake pad that includes a friction body 370 that is placed in contact with a rim of the tire 30 to cause braking of the bicycle by stopping rotation of the tire 30. The friction body 370 can be a rubber body and the brake pad 360 includes a stem or post 380 that extends radially outward from the friction body 370. The stem 380 is inserted into the slot 330 for coupling the brake pad 360 to the first caliper 310. It will be appreciated that the brake pad 360 can be adjusted not only longitudinally along the first caliper 310 at the second end 314 by moving the stem 380 longitudinally within the slot 330 but also the brake pad 360 can be pivoted relative to the first caliper 310. For example, the stem 380 has a cylindrical shape and therefore, it can be rotated within the slot 330, thereby permitting the brake pad 360 to also rotate. By allowing the brake pad 360 to be moved longitudinally within the slot 330 and also be pivoted within the slot 330, the brake pad 360 can be adjusted relative to the particular type of tire 30 that is present on the bicycle. More particularly, different bicycles have different tires sizes and therefore, the location of the tire's rim can differ from tire to tire, thereby necessitating some ability to adjust the brake pad 360 relative to the tire 30 to allow a proper fit between the brake and the tire.

The first end 312 also includes a second upstanding flange 390. Like the first flange 320, the second flange 390 can be formed perpendicular to the base section 315. The second flange 390 is not as big as the first flange 390 but it does include an opening or slot 392 formed therein for receiving a member as described below. In the illustrated embodiment, the opening 392 has a circular shape. Both the first flange 320 and the second flange 390 are formed along the inner edge of the caliper 310.

As mentioned above, the second caliper 350 is a mirror image of the first caliper 310 and therefore, like elements have been numbered alike. In particular, the second caliper 350 includes the same components as the first caliper 310 and therefore, the same components have been numbered the same.

As shown in FIG. 4, when the first and second calipers 310, 350 are mated together, the first caliper 310 is disposed at least partially over the second caliper 350 and in particular, the base section 315 of the first caliper 310 is disposed over the base section 315 of the second caliper 350 such that the openings 319 of the two calipers are axially aligned with one another. The two calipers 310, 350 are pivotally attached to one another using a fastener 400, such as a pin, as shown. The pin 400 includes a shaft 402 and a head 404 at one end. A first washer 410 is received within the circular shaped recess 227 that is formed in the floor 222. The opening in the washer 410 is thus aligned with the opening 225. The washer 410 is sized to sit within the circular shaped recess 227. A second washer 420, preferably identical to the first washer 410 is provided.

The pin 400 is inserted into the opening of the second washer 420 such that the second washer 420 is disposed against the head 404 of the pin 400. The second washer 420 thus seats against a top surface of the base section 315 of the first caliper 310.

A spacer 430 is also provided and is disposed underneath the second part 220. The spacer is generally hour glass shaped and includes a central bore 432 formed therethrough for receiving the pin 400. At opposing ends of the spacer 430, flanges 434 are formed. One flange 434 seats against the underside of the second part 220 with the bore 432 being axially aligned with the opening 225. The other flange 434 seats against the cross member 24 that is part of the frame 10. The pin 400 can be a threaded bolt that fasteningly attaches to the cross member 24, thereby attaching the brake device 100 to the frame 10. The spacer 430 is thus designed to space the housing 200 a prescribed distance from the cross member 24.

By passing the pin 400 through the axially aligned openings 319 of the at least partially overlapping base sections 315, each of the first and second calipers 310, 350 pivot about the pin 400 between a retracted position in which the second ends 314 of the calipers 310, 350 are spaced farthest apart and an engaged position in which the second ends 314 of the calipers 310, 350 are spaced closer to one another. In this manner, the brake pads 360 are moved either in a direction towards the tire or away from the tire. When assembled, the first and second calipers 310, 320 assume a wishbone shape.

Referring to FIGS. 4-9, the brake assembly 300 also includes an electronic drive component, as well as a gear mechanism 305 for opening and closing the calipers 310, 350.

For example, the brake assembly 300 can include an electronic motor 500 that is mounted on the base section 315 of the first caliper 310. In particular, the motor 500 is arranged so that a drive shaft that includes a first gear 510 faces the inner edge of the first caliper 310. The first gear 510 can be of spur gear type that has teeth formed along an outer periphery of the gear.

More specifically, the motor 500 is disposed across the base section 315 and preferably, the length of the motor 500 is about equal to or less than a width of the base section 315. The motor 500 can be attached to the base section 315 using traditional techniques, including fasteners, bonding, adhesives, etc. When mounted, the first gear 510 is proximate to, aligned with or slightly protruding beyond the inner edge of the first caliper. The motor 500 is mounted such that it is disposed adjacent the second flange 390.

The brake assembly 300 and in particular, the motor 500 thereof, is electrically connected to the PCB 201 and is powered by the power source 203 in response to a first control signal to actuate the electric motor. The first control signal is preferably issued by the processor. The processor operates upon wireless command signals received at a receiver so as to identify the nature of the command (e.g., a command to partially engage the brake, fully engage the brake, or disengage the brake). The processor outputs a control signal as a function of the identified command in one embodiment of the invention. In such an embodiment, a first control signal can be provided to actuate the electric motor and cause it to disengage the brake. Also, in such an embodiment, further control signals can be provided by the processor in order to partially engage the brake or to fully engage the brake, and depending on the signal the motor is actuated, for instance, to turn in a certain direction (e.g., the opposite direction than when it is disengaging the brake), or to turn a certain amount (e.g., a little to slow the bicycle gradually or a lot to stop the bicycle more quickly). Thus, for instance, a second control signal can be identified by the processor and used to partially engage the brake and a third control signal can be identified by the processor and used to fully engage the brake.

In another embodiment, a single control signal can be issued to intermittently engage or disengage the brake. In this embodiment, a flip-flop or the like can be used to maintain state information and permit the same wireless command signal from a remote control to cause two different motor actuations (e.g., spin one way, then spin the next to effect brake engagement and disengagement). By monitoring the transmission time of such a command signal, further logic can be used in the circuitry to provide enhanced operation such as partial engagement for gradual stopping.

The first gear 510 associated with the motor 500 intimately engages (meshes) with a second gear assembly to cause controlled movement of the calipers 310, 350. For example, the second gear assembly is actually coupled (mounted) to both the first and second calipers 310, 350 as described below to cause the desired movement between the brake pads 360 (retracted and engaged positions). The second gear assembly includes a second gear 520 that is complementary to the first gear 510 and has teeth formed about its outer surface that interlockingly mesh with the teeth of the first gear 510. The second gear 520 includes a center bore 522 formed therethrough and which can be in the form of a threaded bore. The second gear 520 is mounted to the second flange 390 by a first hub 530 or the like that has a cylindrical shape to allow it to seat within the opening 392 formed in the second flange 390 such that it is prevented from rotating.

Thus, the first hub 530 can have a pair of annular shaped flanges at its ends to assist in coupling the first hub 530 to the second flange 390. In particular, when the first hub 530 is coupled to the second flange 390, the two flanges are disposed on the two opposing faces of the second flange 390 to lock the first hub 530 in place. The first hub 530 also has a center bore 532 formed therethrough and which can be in the form of a threaded bore.

As described below, when mounted, the first hub 530 is disposed within the opening 392 formed in the second flange 390 of the first caliper 310 and the second gear 520 is disposed proximate an inner surface of the second flange 390 which faces the opposing second flange 390 that is part of the second caliper 350.

Another part of the gear mechanism 305 is a threaded rod or shaft 600 and in one embodiment the mechanism for translating the drive action of the motor 500 to an opening and closing action between the two calipers 310, 350 is a worm gear mechanism. More specifically, the threaded rod 600 is in the form of a worm and the second gear 520 is a worm gear in that the center bore 522 thereof includes worm gear threads (teeth) that mesh with the teeth of the worm 600. Rotation of the worm gear 520 drives the worm 600 as described below.

A first end 602 of the worm 600 mates with the worm gear 520, while an opposite end 604 of the worm 600 mates with a second hub 610. The second hub 610 has a cylindrical shape to allow it to seat within the opening 392 formed in the second flange 390 of the second caliper. Thus, the second hub 610 can have a pair of annular shaped flanges at its ends to assist in coupling the second hub 610 to the second flange 390. In particular, when the second hub 610 is coupled to the second flange 390, the two flanges are disposed on the two opposing faces of the second flange 390 of the second caliper 350. The second hub 610 also has a center bore 612 formed therethrough and which can be in the form of a threaded bore to allow the worm 600 to engage (mesh with) the threads of the bore 612.

As best shown in FIGS. 6-9, the worm 600 extends between and is coupled to the two hubs 530, 610 and is thus coupled to the first and second calipers 310, 350.

When assembled, the outer teeth of the second gear 520 mesh with the teeth of the first gear 510 that is part of the drive shaft of the motor 500. As a result, as the motor 500 is driven in a first direction, the first gear 510 rotates in a first direction and rotation is likewise imparted to the worm gear 520. The rotation of the worm gear 520 causes the worm 600 to be driven in a first direction and since the opposite end of the worm 600 is coupled to the other caliper 350, the driving of the worm 600 causes the two second flanges 390 of the calipers 310, 350 to be either drawn closer together (e.g., for applying the brake device) or driven further apart (e.g., for disengaging the brake device). Conversely, when the motor 500 is driven in a second direction, the rotation is likewise imparted to the worm gear 520 and this causes the worm 600 to be driven in a second direction, thereby causing the calipers 310, 350 to move in an opposite direction.

As a result of the electronic motor 500, the brake device 100 can easily be actuated to move the calipers 310, 350 towards one another such that the brake pads 360 are brought into contact with the rim of the tire 30 resulting in the tire 30 being stopped. Conversely, when the calipers 310, 350 are driven away from one another, the brake pads 360 are disengaged from contact with the rim of the tire, thereby allowing the tire to freely rotate again.

In accordance with the present invention, the brake device 100 is part of a remote control system that allows a user, such as a parent, to remotely control the operation of the brake device 100 by transmitting wireless command signals to the brake device 100. For example, the user can remotely cause both the activation of the brake device 100 resulting in brake pads 360 contacting the rim of the tire 30, as well as, the disengagement of the brake device 100, whereby the brake pads 360 are removed from frictional contact with the rim of the tire 30.

FIG. 1 shows the basic components of the remote control system and in particular, a remote control unit 90 is provided and is used to control the operation of the brake device 100. The remote control unit 90 is in the form of a hand-held unit that includes at least one button 92 that controls the operation of the brake device 100. The remote control unit 90 can be in the form of a radio-frequency (RF) remote control that transmits signals to control the operation of the brake device. In embodiments in which multiple command signals are issued and processed into multiple control signals, additional transmission buttons can be provided on the remote control.

Radio-frequency (RF) remote controls are fairly common and are found in garage-door openings, car-alarm fobs, and radio-controlled toys. An RF remote transmits radio waves that correspond to the binary command for the button that is being pushed. A radio receiver on the controlled device receives the signal and decodes it. Due to the vast amount of these type of devices in use, there are a number of radio signals being transmitted through the air at any given time. Cell phone, walkie-talkies, WiFi setups and cordless phones all transmit radio signals at varying frequencies. RF remotes address the interference issue by transmitting at specific radio frequencies and by embedding digital address codes in the radio signal. This lets the radio receiver on the intended device know when to respond to the signal and when to ignore it. One of the advantages of radio-frequency remotes is their range. These remotes can transmit up to 100 feet from the receiver and radio signals can go through walls or other obstructions.

Some circuits such as the XBEE 2 from Digi International can transmit on a line-of-sight basis up to 400 feet outdoors. Presently, the XBEE 2 RF module is a preferred choice of component for inclusion in the remote control 90. The circuitry within the remote control need only have a power supply, a user-control (e.g., one or more buttons), a microcontroller to receive commands from the user via the user-control and instruct the RF module to transmit those commands to the electronic brake 100. The circuitry within the remote control 90 can include conventional supporting circuitry as understood by those of skill in the art.

Since security is not an issue in the present application compared car-alarm fob applications, the remote control can be of a fairly simple design. In particular, the remote controller can include a controller chip and a DIP switch that is soldered to the PCB 201. By setting the DIP switches inside the transmitter, the code that the transmitter sends is controlled. In this way, interference with a second brake device 100 can be avoided by changing the transmission characteristics of one of the devices through the DIP switches. Alternatively, the transmitter can consist of a number of transistors and a number of resistors. A two-transistor design can be powered by batteries 203 and have a simple design such as found in inexpensive walkie-talkies.

The remote control unit 90 thus can include a transmitter and can include one or more buttons to operate the remote control unit 90. A corresponding receiver is part of the brake device 100 and is located in the housing 200.

It will also be appreciated that the remote control unit 90 can be signed to have a single button which when pressed and held in, sends a signal to the brake device 100 to cause actuation of the motor 500. As discussed above, actuation of the motor 500 results in the calipers 310, 350 being moved into the engaged braking position where the brake pads 260 are brought into contact with the rim of the tire 30. This results in stopping of the bicycle. When the user wishes to release the brake device 100 (brake pads 360 moved to a disengaged position), the user simple removes his or her hand from the button so as to remove the force being applied to the button. This causes the motor 500 to rotate in the opposite direction causing the calipers 310, 350 to be driven apart from one another, thereby disengaging the brake pads 360 from the rim of the tire.

Alternatively, the brake device 100 can be disengaged by pressing another button which causes the motor to turn in the opposite direction to cause the calipers 310, 350 to separate. Still another variation is that a single button can be pressed once to engage the brake and pressed again to disengage the brake, in a toggle manner.

In a more advanced design, the remote control unit 90 can have different levels of braking. For example, one button can be pressed to completely brake the bicycle by driving the brake pads 360 into contact with the tire. Another button can send a signal that is processed by the processor to cause engagement of the brake pads 360 with the tire for a select period of time and is then released. This causes the bicycle to be partially braked or slowed down without a complete braking.

In yet another embodiment, the "brake activation" button of the remote can be designed so that it can operate in two different modes, namely, a first mode, similar to above, where the user presses and holds the button down to cause the brake to fully engage and thus, stop the bicycle completely, and a second mode where selective braking occurs. More specifically, for selective braking where the force applied to the brake pad 360 to drive the brake pad into contact with the rim of the tire is increased upon successive pressing of the button. For example, the user can successively press the remote control button to cause the brake pad 360 to be driven into greater frictional contact with the tire rim.

In this embodiment, the motor can be a stepper motor and the remote control circuit can be designed so that successive pressing of the button causes incremental turning of the motor to drive the brake pad toward the rim of the tire. For example, the first press of the button may only result in slight friction between the brake pad 360 and the rim of the tire to a degree where the bicycle is not fully stopped but merely slowed down slightly. Further pressing of this button can cause further and more dramatic slowing down of the bicycle to a point where the bicycle is fully stopped.

There are remote control brake devices on the market; however, these devices suffer from a number of disadvantages, including but not limited to the device being designed so that once it is "fired"/activated to bring the bicycle tire to a stop, the brake device must be manually reset (disengaged) before the bike's tire can freely rotate and the child continue riding. This not only requires the parent to continually walk over to the bicycle and depress the stopper member but it also is frustrating for the child who wishes to be "free" of the parent and feel a sense of pride of riding a bicycle without the assistance of his or her parent.

The present invention overcomes the deficiencies of the prior art by allowing the user to remotely disengage the brake device 100. By simply removing the force being applied to an actuation button, the remote control unit 90 can be placed into a normal operating mode where the calipers 310, 350 are moved and maintained in an open position, thereby allowing normal bicycle riding to occur. Alternatively, the remote control unit 90 can be designed to include a disengagement button whereby when the user presses the disengagement button, a signal is sent to the brake device 100 to cause the motor 500 to rotate in a different direction to cause the worm 600 to move in the opposite direction. This results in the calipers 310, 350 being driven apart (opening), thereby causing the brake pads 360 to disengage from the rim of the tire 30.

It will also be appreciated that other types of remotes can be used including a remote control having a control wheel. By manipulating the wheel, different signals are sent to the unit to cause the calipers to open or close, respectively. In any event, the remote control unit 90 is designed to allow both remote engagement of the brake device 100 and remote disengagement of the brake device 100. In the event that the child is placed in harm's way or the parent wishes to slow down the speed of the child's bicycle, the parent simply actuates the remote control unit to cause activation of the brake device 100.

Another advantage of the brake device 100 is that it can easily be retrofitted onto existing coaster brake bicycles since it is easily mounted using the existing threaded bore (opening) that is formed in the cross member 24. The bolt 400 is threadingly mated therewith to couple the brake device 100 to the frame of the bicycle. This allows the brake device 100 to be simply retrofitted to any existing coaster brake type bicycle.

Now referring to FIGS. 10-15, a remote control (electronic) brake device 700 according to another embodiment is illustrated. The device 700 is similar to the device 100 and includes a number of the same or similar components.

The brake device 700 includes a housing 710 that stores a power source 720 such as batteries or a rechargeable fuel cell in a battery receptacle, with the power source electrically connected to circuitry configured to implement remote, wireless braking of the wheel of a bicycle. The housing 710 also includes an electronically actuated caliper brake assembly 800. The housing 710 includes a first part 730 and a complementary second part 740. The first part 730 can be thought of as a top part, while the second part 740 can be thought of as a bottom part. The second part 740 is a substantially hollow member that defines a first compartment 750 for holding the power source 720 and a second inner compartment 760 for storing other working components of the device 700.

The first compartment 750 is formed along a top of the second part 740 and includes recessed sections that receive one or more batteries 720. The first part 730 is in the form of a cover that is securely attached to the second part 740 to cover and locate the batteries 720. The cover 730 can be an L-shape cover that includes an opening that receives a fastener 731 for securely attaching the cover 730 to the second part 740. The fastener 731 can be in the form of a screw or the like that passes through the cover and is received within a complementary opening (threaded opening) formed in the second part 740.

The caliper assembly 800 includes a number of components that interact and are coupled to one another. The caliper brake assembly 800 includes a first brake caliper 810 and a second brake caliper 850 that is similar to the first brake caliper 810. The first brake caliper 810 includes a first end 812 and an opposing second end 814. The first brake caliper 810 has a first section 815 that terminates at the first end 812 and represents a bent or curved section and a second section 817 that terminates at the second end 814. The second section 817 is substantially perpendicular to the first section 815.

At the first end 812, a first opening 819 is formed and a second opening 821 is formed proximate the first opening 819 and within the first section 815. The second opening 821 represents a pivot point for the first and second brake calipers 810, 850. The opening 821 can have a circular shape.

At the second end 814, an upstanding first flange 820 is formed. The flange 820 includes a slot 830, such as a longitudinal slot. The first flange 820 can be formed perpendicular to the first section 815.

The first and second calipers 810, 850 can be formed of a number of different materials, including metals or other materials, including rigid plastics.

A brake pad 860 is provided and is intimately inserted into and held within the slot 830. The brake pad 860 can be a conventional brake pad that includes a friction body 870 that is placed in contact with a rim of the tire 30 to cause braking of the bicycle by stopping rotation of the tire 30. The friction body 870 can be a rubber body and the brake pad 860 includes a stem or post 880 that extends radially outward from the friction body 870. The stem 880 is inserted into the slot 830 for coupling the brake pad 860 to the caliper 810, 850. It will be appreciated that the brake pad 860 can be adjusted not only longitudinally along the caliper 810, 850 at the second end 814 by moving the stem 880 longitudinally within the slot 830 but also the brake pad 860 can be pivoted relative to the first caliper 810. For example, the stem 880 has a cylindrical shape and therefore, it can be rotated within the slot 830, thereby permitting the brake pad 860 to also rotate. By allowing the brake pad 860 to be moved longitudinally within the slot 830 and also be pivoted within the slot 830, the brake pad 860 can be adjusted relative to the particular type of tire 30 that is present on the bicycle. More particularly, different bicycles have different tires sizes and therefore, the location of the tire's rim can differ from tire to tire, thereby necessitating some ability to adjust the brake pad 860 relative to the tire 30 to allow a proper fit between the brake and the tire.

As mentioned above, the second caliper 850 is similar to the first caliper 810 and therefore, like elements have been numbered alike. In particular, the second caliper 850 includes many of the same components as the first caliper 810 and therefore, the same components have been numbered the same. The main difference between the first caliper 810 and the second caliper 850 is that the first caliper 810 includes a leg 811 that extends outwardly from the first section 815. The leg 811 can terminate in a planar edge and a slot 813.

Figure 15:
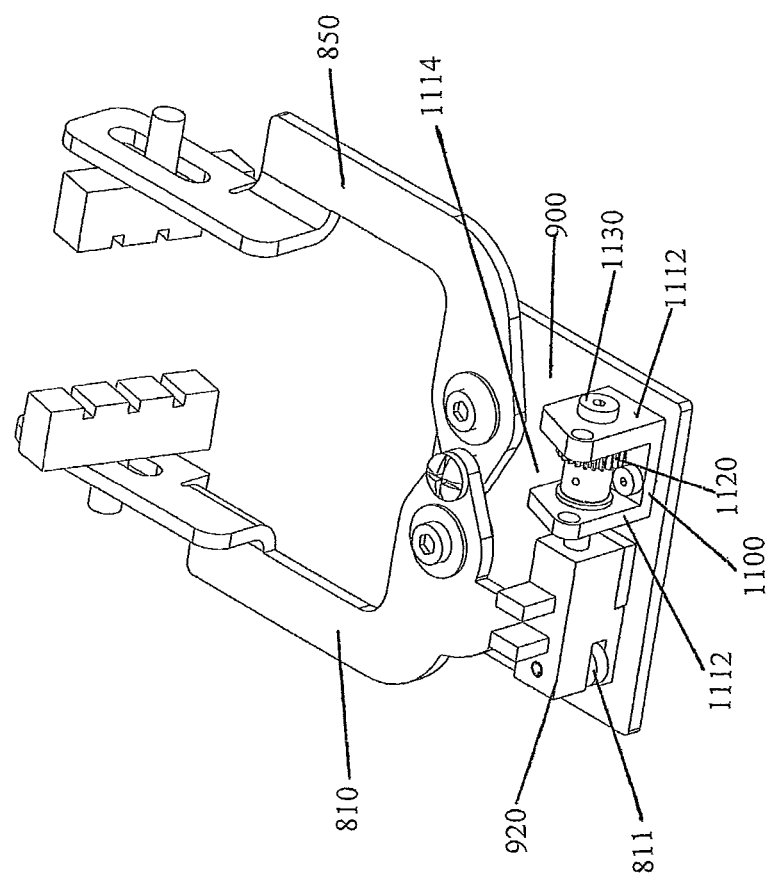
FIG. 15 is a perspective view of the caliper arms and several gear/motor components.

As shown in FIG. 15, when the first and second calipers 810, 850 are mated together, the first caliper 810 is disposed at least partially over the second caliper 850 and in particular, the first section 815 of the first caliper 810 is disposed over the first section 815 of the second caliper 850 such that the first openings 819 of the two calipers are axially aligned with one another. The two calipers 810, 850 are pivotally attached to one another using a fastener 851, such as a pin, as shown. The pin 851 includes a shaft and a head at one end.

The caliper assembly 800 includes a base or support 900 which supports a number of components and also supports the first and second calipers 810, 850. More specifically, the first caliper 810 is pivotally attached to the base 900 using a fastener 910 that passes through the second opening 821. A washer 912 and nut 913 can be used.

On an underside of the support 900, a post 901 is provided and extends outwardly therefrom. The post 901 is axially aligned with the fastener that couples the caliper arms 810, 850 and is between the pair of fasteners used to pivotally connect the caliper arms 810, 850 to the base 900. The post 901 is used to couple the device to the frame of the bicycle. For example, the post 901 can be threaded and a nut can be used to securely attach the device 700 to the bicycle.

The support 900 also supports the other working components of the device 700. For example, a slider 920 is provided for coupling to the driven caliper arm 810 and to regulate the driving of the caliper arm 810. As mentioned above, the caliper arms 810, 850 are not identical but rather the first caliper arm 810 can be thought of as a driven caliper arm 810, while the second arm 850 is a slave caliper arm that is driven by the driving action of the caliper arm 810. The slider 920 is in the form of a block that has a top surface 922, a bottom surface 923, a first end 924 and a second end 926.

The bottom surface 922 is not a flat continuous surface but include a notch 925 formed therein at second end 926 so as to define a stepped surface. Within the notch 925, a plate or wafer 940 is provided. The plate 940 is generally square shaped and includes a protrusion 944 formed on a top surface 942 thereof. In the illustrated embodiment, the protrusion 944 is also square shaped and is formed in one corner of the top surface 942. The plate 940 is fixed to the support 900 and the slider 920 is received thereover with the plate 940 being received within the notch 925 of the slider 920. As mentioned above, the slider 920 moves (slides) in a linear manner across the support 900 and relative to the plate 940 fixed thereton. The movement of the slider 920 is discussed below in more detail.

At the first end 926 of the slider 920, a slot 950 is formed and a pin hole 960 is formed in the top surface of the slider 920 and is in communication with the slot 950. The leg 811 is received within the slot 950 of the slider 920 and a coupling member, such as a fastener or pin 975, is received through the pin hole 960 to hold the first caliper arm 810 to the slider 920. The pin 975 can pass through the slot 813 of the leg 811 to permit pivoting of the caliper 810. In other words, the pin or fasteners fixes first caliper arm 810 the slider 920 such that linear movement of the slider 920 is translated into pivoting of the first caliper arm 810. For example, when the slider 920 moves linearly away from the fixed plate 940 and toward one edge of the support 900, the first caliper 810 pivots so as to close the first caliper arm 810.

The top surface of the slider 920 includes a pair of upstanding fingers 970, 972. The fingers 970, 972 are spaced from one another to define a space 975. The fingers 970, 972 can be square shaped. The slider 920 includes a bore 980 formed therein that is open at the second end 926 and is in communication with the slot 950.

As mentioned above, the device 700 is a motorized unit and includes a motor and gear assembly 1000. For example, the assembly 1000 can be an electric motor based unit that can be driven in two opposite directions.

The assembly 1000 includes a number of different components including a motor 1010. The motor 1010 is electrically connected to both the power supply and the electronic controller (PCB) and is mounted on the support 900 proximate the slider 920. Any number of conventional electric motors can be used including a stepper motor or other type of electric motor that can be controllably driven in two directions with precision.

A first gear holder 1100 is fixed to the top surface of the support 900 adjacent the slider 920. The first holder 1100 includes a pair of upstanding end walls 1112 with a space 1114 formed therebetween. The space 1114 receives a first gear 1120 with the gear 1120 being held above the floor of the holder 1100. The gear 1120 has a central bore 1122 formed therethrough. The first gear 1120 has a toothed end 1125. The upstanding end walls 1112 include axially aligned openings with a slider drive shaft (worm) 1130 being disposed through one set of openings. The drive shaft 1130 passes through the bore 1122 formed in the gear 1120. As a result, the drive shaft 1130 and gear 1120 are coupled to one another such that rotation of the gear 1120 is translated into rotation of the drive shaft 1130. The drive shaft 1130 extends through and beyond the holder 1100 and a distal end of the drive shaft 1130 is coupled to the slider by passing through the opening formed in the second end thereof. It will be appreciated that as the drive shaft 1130 is rotated in a first direction, the shaft 1130 advances in a direction toward the slider 920 and this causes a linear driving action to be imparted to the slider 920. In other words, the slider 920 is driven in a direction away from the holder 1100 causing a closing of the caliper arm 810. Conversely, when the motor is actuated and rotates in an opposite direction, the opposite rotation of the gear 1120 and drive shaft 1130 causes the drive shaft 1130 to be retracted in a direction away from the slider 920 causing the slider 920 to move linearly toward the holder 1100 and thus open the caliper arm 810.

It will be appreciated that the gear arrangement of the present invention is intended to "step down" the speed at which the motor operates since in use, the device 700 should work smoothly and operate at slower speeds to allow a controlled, smooth braking operation as opposed to a sudden, violent braking action. In one embodiment, the gear arrangement "steps down" the speed of the motor by about 75%. The permits the slider 920 to be moved linearly in a controlled, smooth manner.

Figure 12:
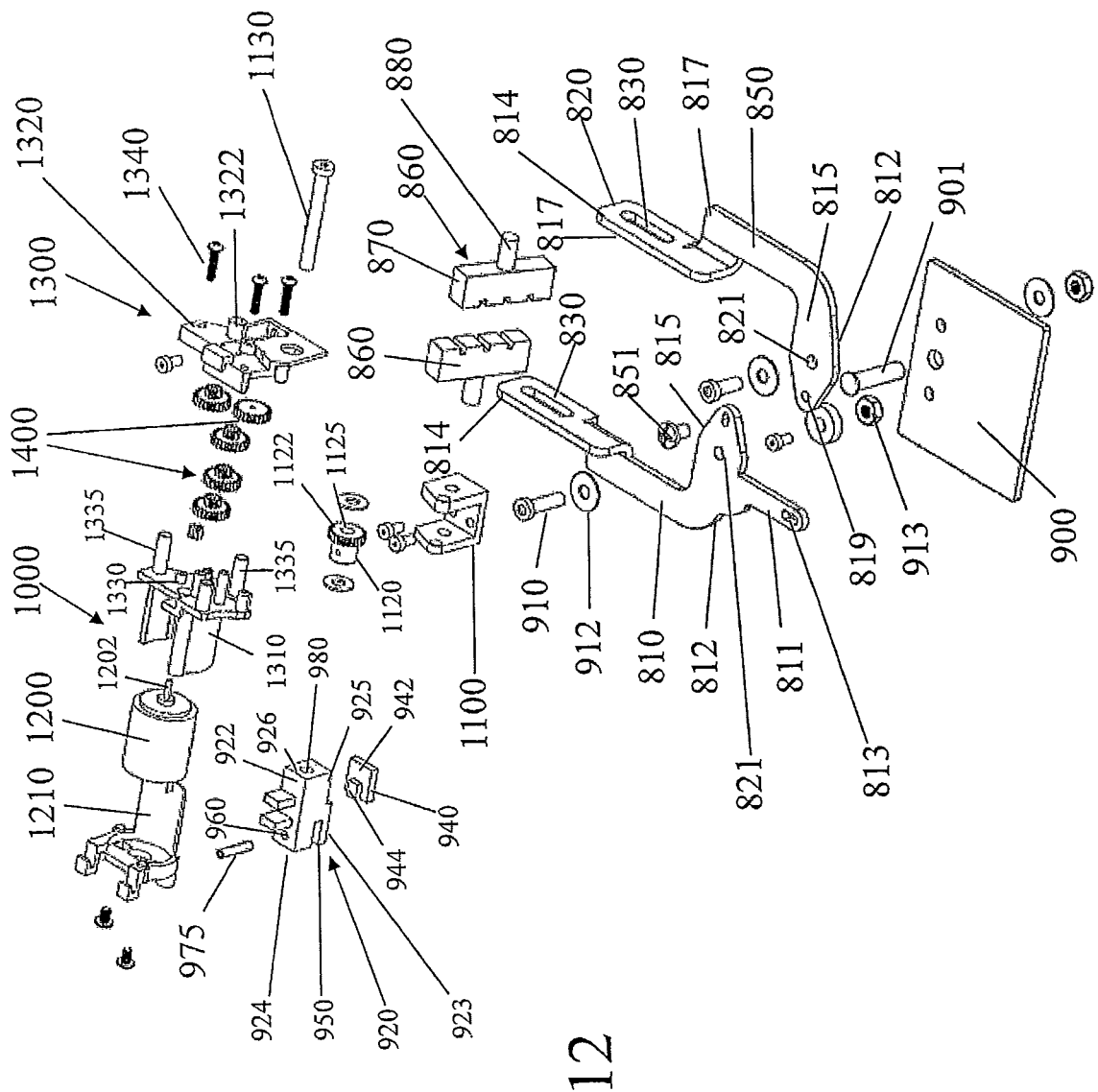
FIG. 12 is an exploded perspective view of a motor and caliper assembly of the device of FIG. 10.

FIG. 12 shows other components that form the gear and motor assembly 1000. For example, the assembly 1000 includes a motor 1200 that is held within a holder 1210. The electric motor 1200 includes a rotating shaft 1202. The assembly 1000 further includes a number of gear components that intimately engage one another and are operatively coupled to the rotating shaft 1202 of the motor 1200. The gear components include a gear housing 1300 that is formed of a first part 1310 and a second part 1320 that mates with the first part 1310. The first part 1310 includes a number of fingers or boss elements 1330 that extend outwardly therefrom and have threaded bores formed therein to permit a plurality of fasteners 1340 to be used to securely attach the second part 1320 to the first part 1310. The second part 1320 is thus complementary to the first part 1310 and includes a plurality of openings 1322 through which the fasteners 1340 pass through. Between the two parts 1310, 1320, a plurality of gears 1400 are disposed and are securely and rotatably held between protrusions or bosses 1335 that are formed on inner surfaces of the two parts 1310, 1320. In other words, the gears have a center hole that receive the protrusions (that act as pins) when the first and second parts 1310, 1320 are coupled to one another. In this manner, each gear 1400 can freely rotate within the housing. Since the protrusions of the two parts 1310, 1320 are formed at different locations and different heights, etc., the gears 1400 can be disposed and held in select locations that permit the proper meshing of the teeth of one gear with the teeth of another. One of the gears 1400 is coupled to the shaft 1202 of the motor and therefore, this gear rotates when the shaft 1202 is driven by the motor. The other gears 1400 are arranged so that the rotation of the gear on the shaft 1202 imparts rotation to the other gears.

As shown in the figures, the gears 1400 are arranged so that one of the gears 1400 is coupled to the first gear 1120 that is coupled to the drive shaft 1130 that itself is coupled to and causes linear motion of the slider 920.

It will be appreciated that the arrangement of gears 1400 as shown is merely exemplary in nature and other gear arrangements are possible so long as operation of the motor 1200 drive the slider 920 in a linear motion (in two directions), thereby permitting both the closing and opening of the first caliper arm 810. For example, the gears 1400 can be in the form of an arrangement of planetary gears as opposed to and as an alternate to the arrangement of gears described and illustrated herein.

Figure 13:
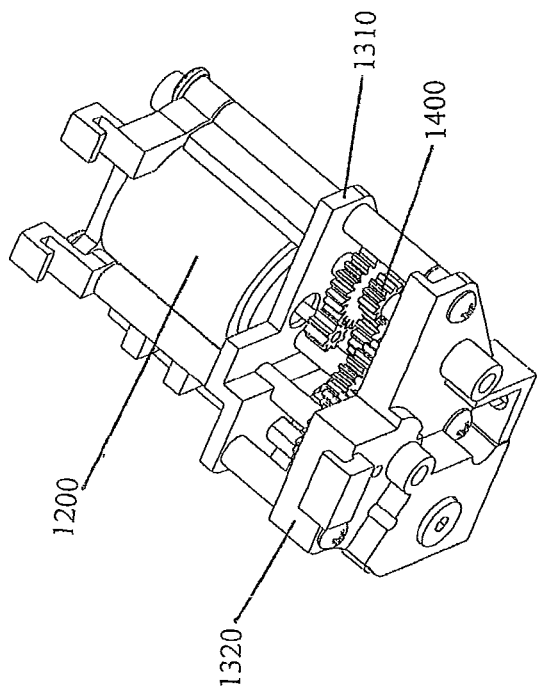
FIG. 13 is a perspective view of the motor and gear assembly in an assembled state.

FIG. 13 shows the fully assembled motor and gear assembly. This assembled unit can be easily and conveniently mounted to the support 900 using conventional techniques including the use of fasteners or pins that are received into holes in the support 900. In FIG. 13, only a small portion of the slider 920 is visible.

Figure 14:
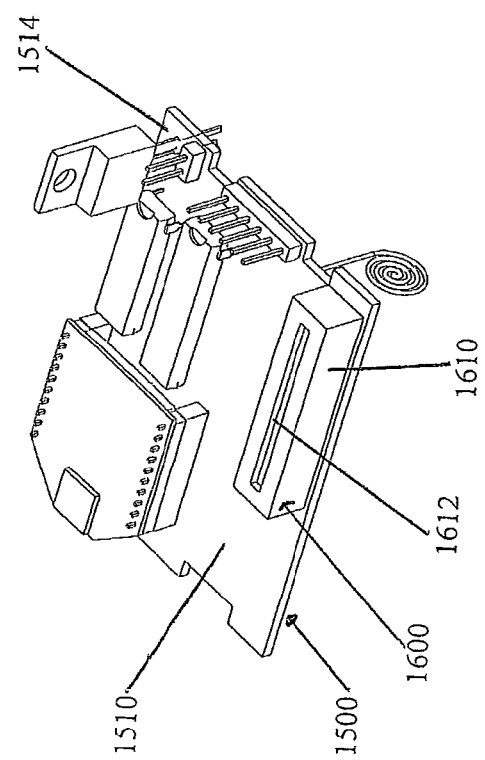
FIG. 14 is a perspective view of a printed circuit board assembly for use in the device of FIG. 10.

FIG. 14 shows a controller 1500 in the form of a printed circuit board that includes a number of electronic components. The controller 1500 includes a main printed circuit board 1510 that has a top surface 1512 and a bottom surface 1514. Most of the electronics are disposed along the bottom surface 1514 with the exception of battery contacts 1520 that are disposed along the top surface 1512, while electrical traces are supported on both sides of the PCB in a conventional manner to electrically connect the components that comprise the circuitry. When batteries are inserted into their respective compartments, the batteries make contact with these contacts 1520.

Figure 14A:
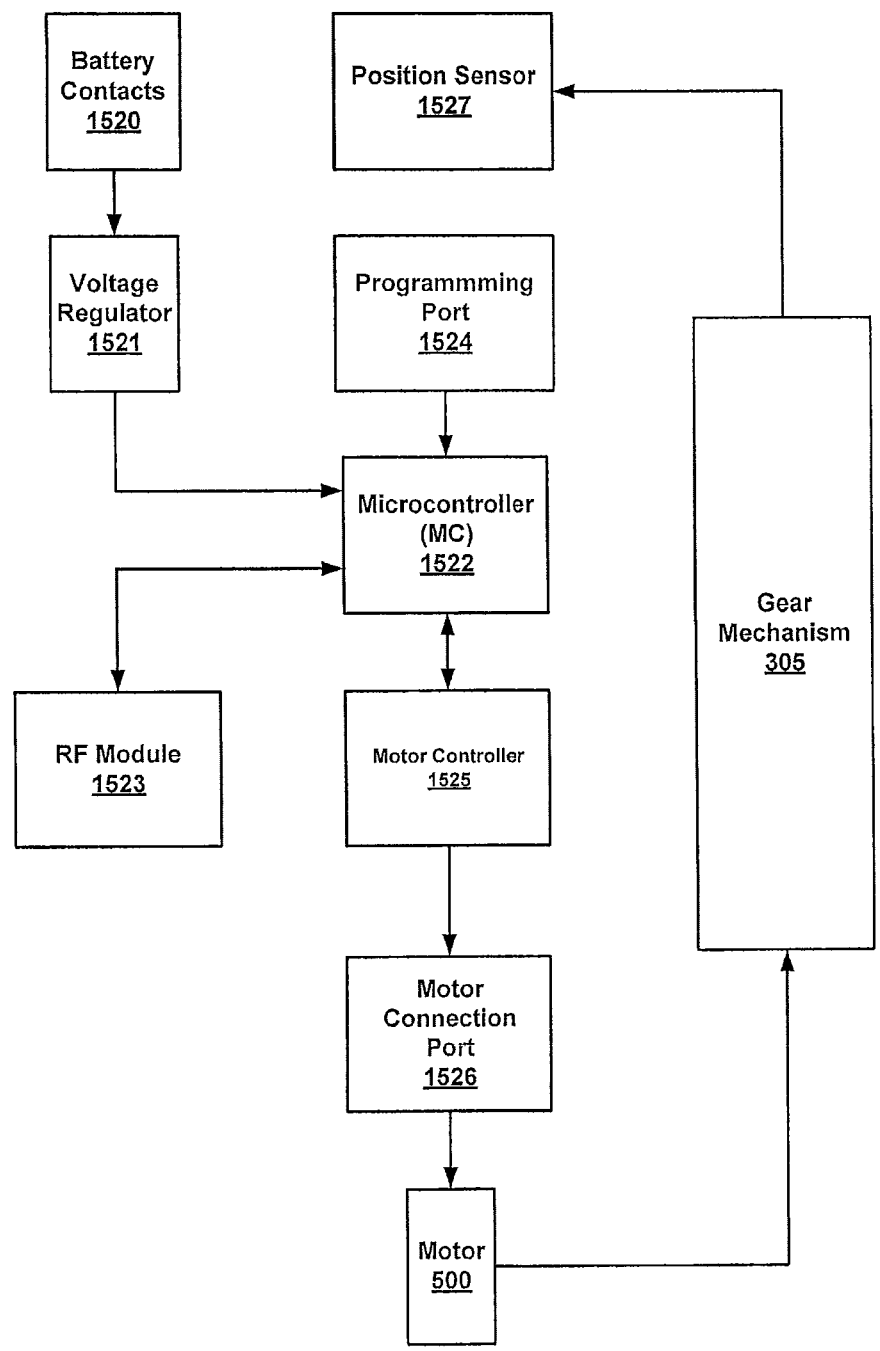
FIG. 14A is a block diagram of a circuit that can be used in the device of FIG. 10.

With reference now to the block diagram of FIG. 14A, battery contacts 1520 provide an electrical path from batteries (e.g., 3 or 4 AA batteries) to power the remaining circuitry on the PCB 1510. A voltage regulator 1521 provides regulated voltage, for example, 3.3 volts, to downstream circuits such as a microcontroller 1522 and a radio receiver circuit 1523. Other components can be driven by the same or a different regulated voltage. As can be seen in FIG. 14A, the circuit that supports operation of the braking device described herein can comprise several integrated circuits (ICs), but also can be comprise fewer or additional ICs. In an arrangement in which several ICs are used, the microcontroller 1522 is programmed to govern operation of the motor 500, including its direction and degree of movement as well as the amount of movement, if any. The microcontroller can be, for example, the PIC 16F690 microcontroller which supports an instruction set suitable for controlling the motor 500 and which has a wide operating voltage range of 2.0 to 5.5 volts and includes onboard EEPROM data memory, among other features. The microcontroller has instructions loaded via a connection to a programming port 1524. A conventional computer such as a personal computer connects to the program port and transfers instructions (software) into the memory of the microcontroller 1522. The software can be updated in existing units or future production runs, for example, to support a different motor 500, a different radio receiver 1523 or to add to or improve on existing functionality of the braking device 100.

The radio receiver IC 1523 can comprise an RF module that can receive data from a remote device, such as the remote control used by a parent to control the braking device 100. One suitable IC for use as the RF module is the XBEE 2 from Digi International, Inc. This module operates within the ZigBee protocol provides a low-power RF receiver that operates within the ISM 2.4 GHz frequency band for outdoor (line-of-sight) distances of up to about 400 feet. The RF module of the illustrated embodiment receives commands from a user in the form of radio-transmitted signals from the remote control 90, via the Zigbee protocol. The RF module 1523 then communicates those commands via a UART port of the microcontroller 1522.

The microcontroller 1522 processes the command signals in accordance with the software that has been uploaded and stored therein. The command signals, as noted previously, can comprise apply or release the brake, or partially apply or partially release the brake. Depending on the command signal, the microcontroller selectively issues an instruction to a motor controller IC 1525. Any number of motor controllers can be used, but preferably, the motor controller implements an H-bridge switching circuit so that a D.C. voltage can be applied to the motor in two different polarities and thereby effect motor actuation in two directions. The motor controller can connect directly to the motor 500 or via a motor connection port 1526 which provides contacts that can be connected to leads extending from the motor to permit assembly of the motor and gear components prior to connection of the PCB 1510 and its supported circuitry. The voltage provided by the motor controller 1525 can be a regulated voltage, such as noted above, or can be a greater voltage such as 5 volts or so. The motor 500 is a D.C. motor, such as a Mabuchi RC 260-Ra 18130 motor available from the Mabuchi Motor Co., Ltd. of Japan.

Preferably, movement of the brakes (e.g., brake calipers or the gear mechanism 305 to which they are coupled) in either direction is associated with a linear potentiometer 1527 that provides position-feedback data to the microcontroller 1522. The position-feedback data provides dynamic information on brake position that the software preferably uses in comparison to its internal state information to determined, for example, whether the motor has been driven sufficiently to give effect to a command signal from the remote control. More particularly, and by way of example only, if the command signal is to iteratively apply the brake mechanism to slow but not stop the bicycle, the microcontroller can use the position-feedback data to first discern the present location of the braking mechanism, issue a command to the motor controller to drive the brake in a first direction, monitor the position-feedback data until a set amount of brake movement has been achieved, and then issue a further command to the motor controller to cease movement of the motor 500. Many variations can be envisioned such as a timing circuit to allow the motor to free run for a period of time (e.g., 0.5 second), followed by stopping the motor, calculating brake movement, and selectively issuing a further motor-drive signal, but the key point in this regard is that the position-feedback data, unlike prior art devices, provides a parameter by which electronic-logic is utilized to not merely apply the brakes until the bicycle is stopped, but which can provide a measured, controlled movement of the brake pads.

Figure 11:
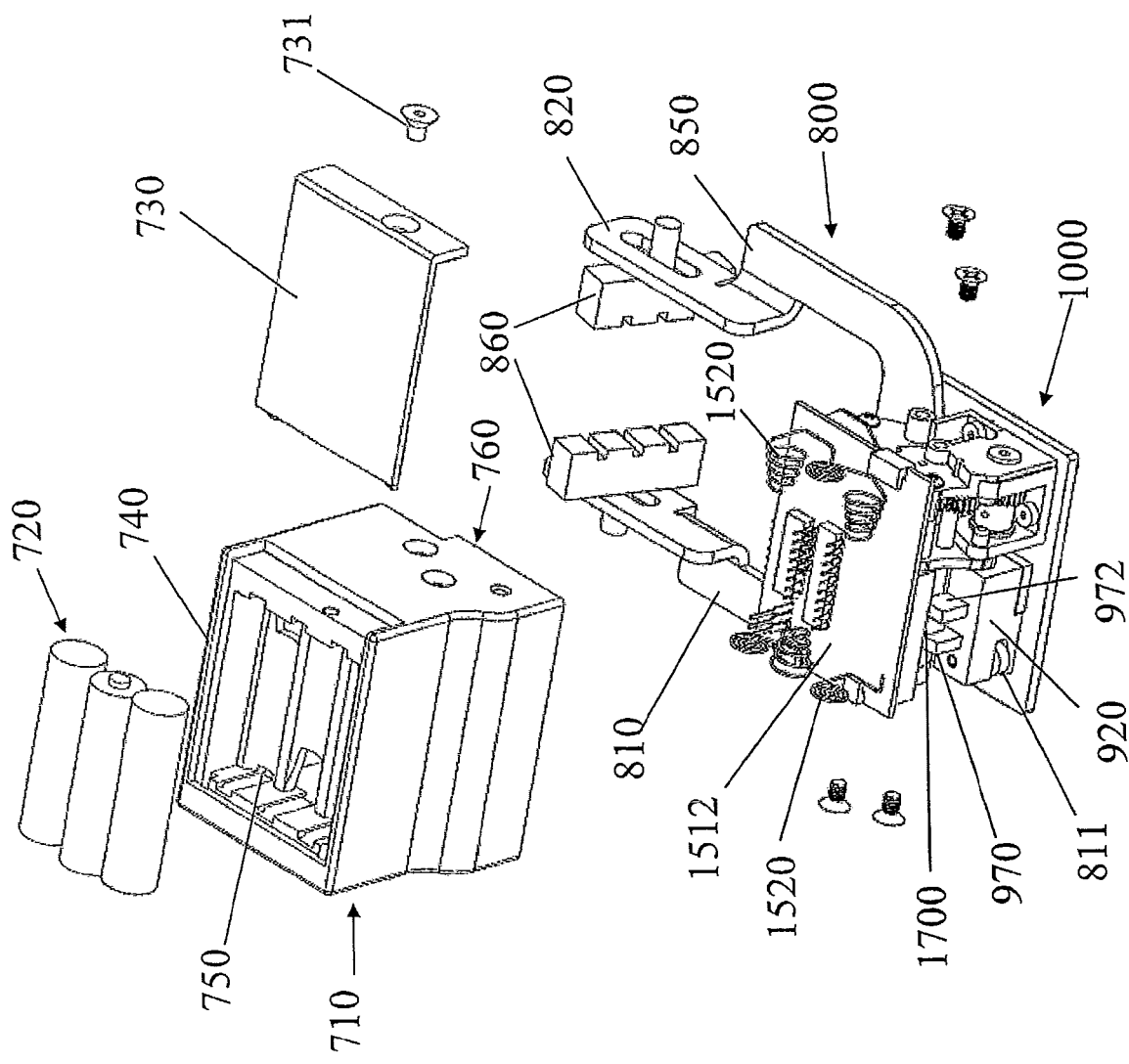
FIG. 11 is an exploded perspective view of the components of the remote control brake device of FIG. 10.

As shown in FIGS. 11 and 14, the device 700 includes a locating or sensor feature 1600 that permits the location of the slider 920 to be readily known and tracked. As a result, the position of the driven caliper arm 810 is likewise known. The locating feature 1600 includes a block 1610 that is disposed along the bottom surface 1514 along one edge thereof. The block 1610 has a guide channel or track 1612 formed therein. As shown, the track 1612 is a linear track formed along the length of the block and thus parallel to the one edge of the block 1610.

The locating feature 1600 also includes a movable tab or finger 1700 that is disposed at one end within the space 975 formed between the fingers 970, 972 and is disposed at another end within the track 1612. In the illustrated embodiment, the tab 1700 is oriented vertically (upstanding) and extends between and thus couples the slider 920 to the block 1610. The block 1610 is fixed in place on the printed circuit board, while the slider 920 moves linearly as discussed above. As a result, when the slider 920 moves linearly, the location of the tab 1700 within the track 1612 changes. It will be appreciated that there is a relationship between the location of the slider 920, the first caliper arm 810 and the tab 1700. By sensing the location of the tab 1700 within the track 1612, the precise position of the slider 920 is determined and since the first caliper arm 810 is coupled to and pivoted by motion of the slider 920, the precise location of the caliper arm 810 can be determined.

The controller 1500 is securely coupled to the gear and motor assembly 1000 and as shown, is disposed across the top of the assembly 1000. This entire structure is inserted into the hollow compartment defined by the second part 740 of the housing 710 and as mentioned before is fixed to the support 900.

The operation of the device 700 is similar to the device 100 and typically the device 700 is initially set so that the device 700, when initially powered on, closes the two caliper arms 810, 850 so as to set a limit and mark the location of the tab 1700 within the track 1612 when the caliper arms are engaged and fully closed (a braking condition). The controller 1500 can then be configured to open the caliper arms 810, 850 a predetermined distance so as to remove the brake pads from engagement with the wheel rim and permit free rotation of the wheel. In other words, the initial automatic closing action defines one end of the degree of travel of both the slider 920 and the coupled tab 1700 and the controller 1500 then is programmed to slightly open the caliper arms. This opening action is highly controllable with a high degree of precision (e.g., by controlling the steps of a stepper motor).

Since there are different sized wheels, the initial setting operation in effect calibrates the system and defines the limits of travel of the caliper arms.

As shown in FIG. 10, a pin hole 1800 can be provided in the second part 740 of the housing 710 to allow insertion of a tool (e.g., allen wrench) to open or close the housing.

The operation of the device 700 is the same or identical to the operation of the device 100 in that a remote control is used to control the operation of the device 700. The device 700 is installed on the bicycle and then as described earlier when the device 700 is initially operated, the two calipers 810, 850 close until contact is made with the rim of the wheel. Once this action is sensed (e.g., movement of the slider 920 in one direction ceases), then the engaged position is recorded and can be stored in memory of the like. This engaged position is the position that will result in the braking of the wheel. The controller 1500 is then configured to effectively back the calipers 810, 850 off the rim by operating the motor in an opposite direction, thereby causing the slider 920 to move in a direction that causes the opening of the caliper arms 810, 850 a predetermined distance. When the user activates the remote control, the caliper arms 810, 850 are slowly driven into the engaged position where the brake pads contact the rim causing the stopping of the bicycle.

Figure 16:
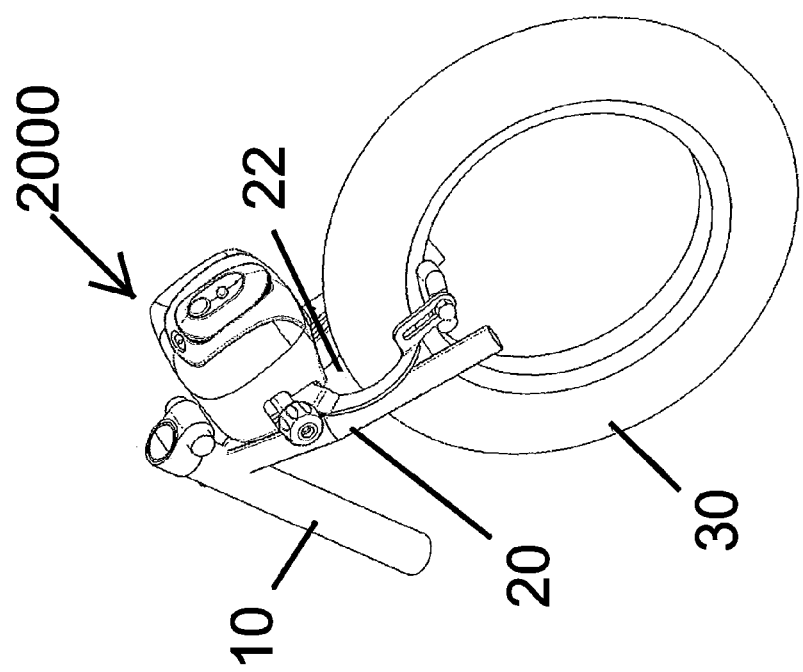
FIG. 16 is a top and side perspective view of a remote control brake device according to one embodiment for a bicycle.
Figure 17:
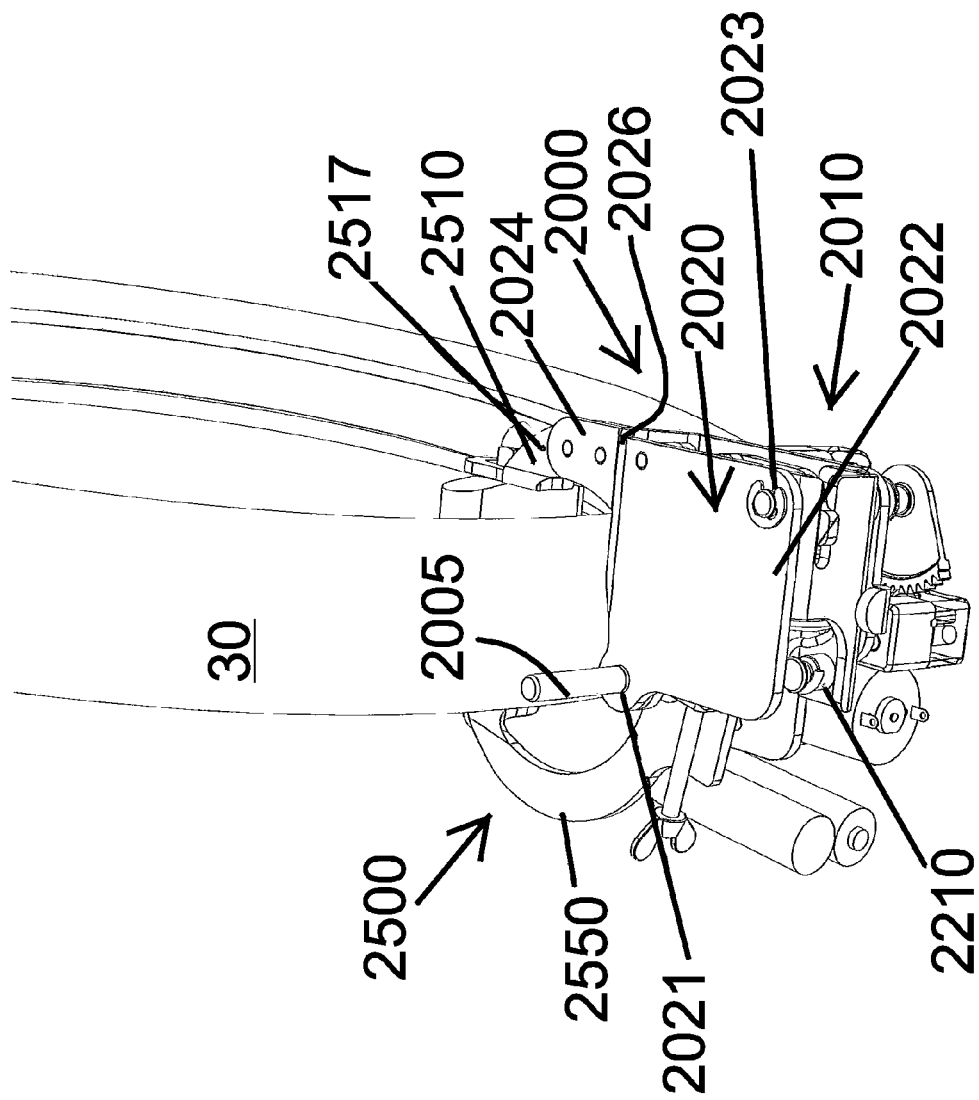
FIG. 17 is a perspective view of internal components of the device of FIG. 16.

FIGS. 16-25 illustrate a remote control (electronic) brake device 2000 for use with a bicycle, especially a child's bicycle. FIG. 16 illustrates the brake device 2000 mounted on frame 10 of a bicycle. The frame 10 includes rear fork 20 that defines space 22 that receives a portion of the tire 30 and therefore, the rear fork 20 at least partially surrounds the tire 30.

The electronic brake device 2000 is similar to the other brake devices and therefore contains like elements that are discussed herein. For example, the device 2000 includes a housing 2010 that contains a number of the components and also includes a caliper assembly 2500.

The caliper assembly 2500 includes a number of components that interact and are coupled to one another. The caliper brake assembly 2500 includes a first brake caliper 2510 and a second brake caliper 2550 that is similar to the first brake caliper 2510. The first brake caliper 2510 includes a first end 2512 and an opposing second end 2514. The first brake caliper 2510 has a first section 2515 that terminates at the first end 2512 and represents a plate-like structure and a second section 2517 that terminates at the second end 2514. As described herein, the first section 2515 represents a mounting surface which can support other components. The first section 2515 and second section 2517 can lie in different planes and in particular, a bent section (a ramp) 2511 can be provided between the two sections 2515, 2517, with the second section 2517 being elevated relative to the first section 2515.

Along a rear edge of the first section 2515, an upstanding tab 2519 is formed and similarly, an opening 2521 is formed in a corner of the first section 2515. Along a front edge of the first section 2515, another opening 2523 is formed and represents a pivot point for the first and second brake calipers 2510, 2550.

At the second end 2514, a flange 2520 is formed. The flange 2520 includes a slot 2530, such as a longitudinal slot. The flange 2520 can be formed perpendicular to the second section 2517.

The first and second calipers 2510, 2550 can be formed of a number of different materials, including metals or other materials, including rigid plastics.

A brake pad 2560 is provided and is intimately inserted into and held within the slot 2530. The brake pad 2560 can be a conventional brake pad that includes a friction body that is placed in contact with a rim of the tire 30 to cause braking of the bicycle by stopping rotation of the tire 30. The friction body can be a rubber body and the brake pad 2560 can include a stem or post 2580 that extends radially outward from the friction body. The stem 2580 is inserted into the slot 2530 for coupling the brake pad 2560 to the respective caliper 2510. It will be appreciated that the brake pad 2560 can be adjusted not only longitudinally along the caliper 2510 by moving the stem 2580 longitudinally within the slot 2530 but also the brake pad 2560 can be pivoted relative to the first caliper 2510. This permits adjustment of the brake pad 2560 as described hereinbefore.

As mentioned above, the second caliper 2550 is similar to the first caliper 2510 and therefore, like elements have been numbered alike. In particular, the second caliper 2550 includes many of the same components as the first caliper 2510 and therefore, the same components have been numbered the same. However, structurally, the two calipers are much different.

The second caliper 2550 includes a first end 2551 and a second end 2552 that contains flange 2520 and slot 2530. The first end 2551 includes an upstanding tab 2553 with an opening formed in it.

As shown in the figures, the second caliper 2550 is substantially planar and is disposed along a portion of the top surface of the first caliper 2510. The caliper 2550 also includes an opening 2556 that is in registration with opening 2523 formed in the first caliper 2510 when the calipers 2510, 2550 mate together. The calipers 2510, 2550 thus rotate relative to one another about this pivot point to move into a brake one and a brake off position.

The housing 2010 includes a number of components including a bracket 2020 that provides an additional mounting surface. In particular, the bracket 2020 is in the form of a plate-like structure which includes several sections that lie in different planes. For example, the bracket 2020 can includes a main first section 2022 and a second section 2024 that lies in a different plane than the plane that contains the first section 2022, with the first section 2022 being connected to the second section 2024 via an intermediate beveled (ramp) section 2026. As shown, the first section 2022 is more of square or rectangular shaped plate section, while the second section 2024 is a finger-like structure. The second section 2024 is mounted to the second section 2517 of the first caliper 2510 and since both the bracket 2020 and the first caliper 2510 have angled intermediate sections, the first section 2515 of the first caliper 2510 and the first section 2022 of the bracket 2020 can be disposed generally parallel to one another and a space is formed therebetween that receives and contains the other working components of the device.

Any number of means can be used to mount the bracket 2020 to the first caliper 2510 including using fasteners.

The bracket 2020 also includes a first opening 2021 that is aligned with the openings 2556, 2523 in the calipers and represents the main pivot location. The bracket 2020 also includes another opening 2023 that serves as another pivot point as described herein.

The main pivot of the device 2000 is defined by a pivot pin 2005 that is an elongated pin that includes an enlarged head. The pivot pin 2005 is linear in nature and is shaped and sized to pass through the respective openings described herein that are formed in the different components to thereby permit pivoting of different components about an axis extending through the pivot pin 2005. The pivot pin 2005 is a fixed pivot and defines a pivot point about which the first and second calipers pivot.

The device 2000 also include a biasing mechanism that applies a biasing force that assists in maintaining the device 2000 in either a brake on position and in a brake off position. For example, the device 2000 includes biasing mechanism 2100 that is coupled between the caliper arms. The biasing mechanism 2100 includes a number of working components that apply a directed force to the calipers 2510, 2550 to assist in movement thereof and to maintain the calipers in the desired orientation.

The biasing mechanism 2100 includes a number of biasing members and linkages for directing the biasing force(s). More specifically, the biasing mechanism 2100 includes a first biasing arm 2120, a second biasing arm 2150. The first biasing arm 2120 is a bent, non-planar part that includes a first end section 2122 and an opposing second end section 2124. At the first end section 2122, an opening is formed to permit the pivot pin 2005 to pass through. In the second end section 2124, a stop 2125 in the form of a tab is formed, as well as an opening 2127 is formed to permit another pivot member to pass therethrough. Similar to other parts, the first biasing arm 2120 includes sections in different planes and in particular, a first section that terminates at the first end section 2122 is in one plane and a second section that terminates in the second end section 2124 is in another plane with the two sections being connected by an angled (ramp) section 2123. A curve is formed between these two sections. The first biasing arm 2120 is generally J-shaped and has a leg-shape.

A spacer element 2129 can be provided and disposed between the second end section 2124 and the underlying portion of the first caliper 2510. The spacer element 2129 provides support for the second section 2124 which is elevated relative to the underlying first caliper 2510. Additional spacer elements can be provided as shown to provide support.

Figure 18:
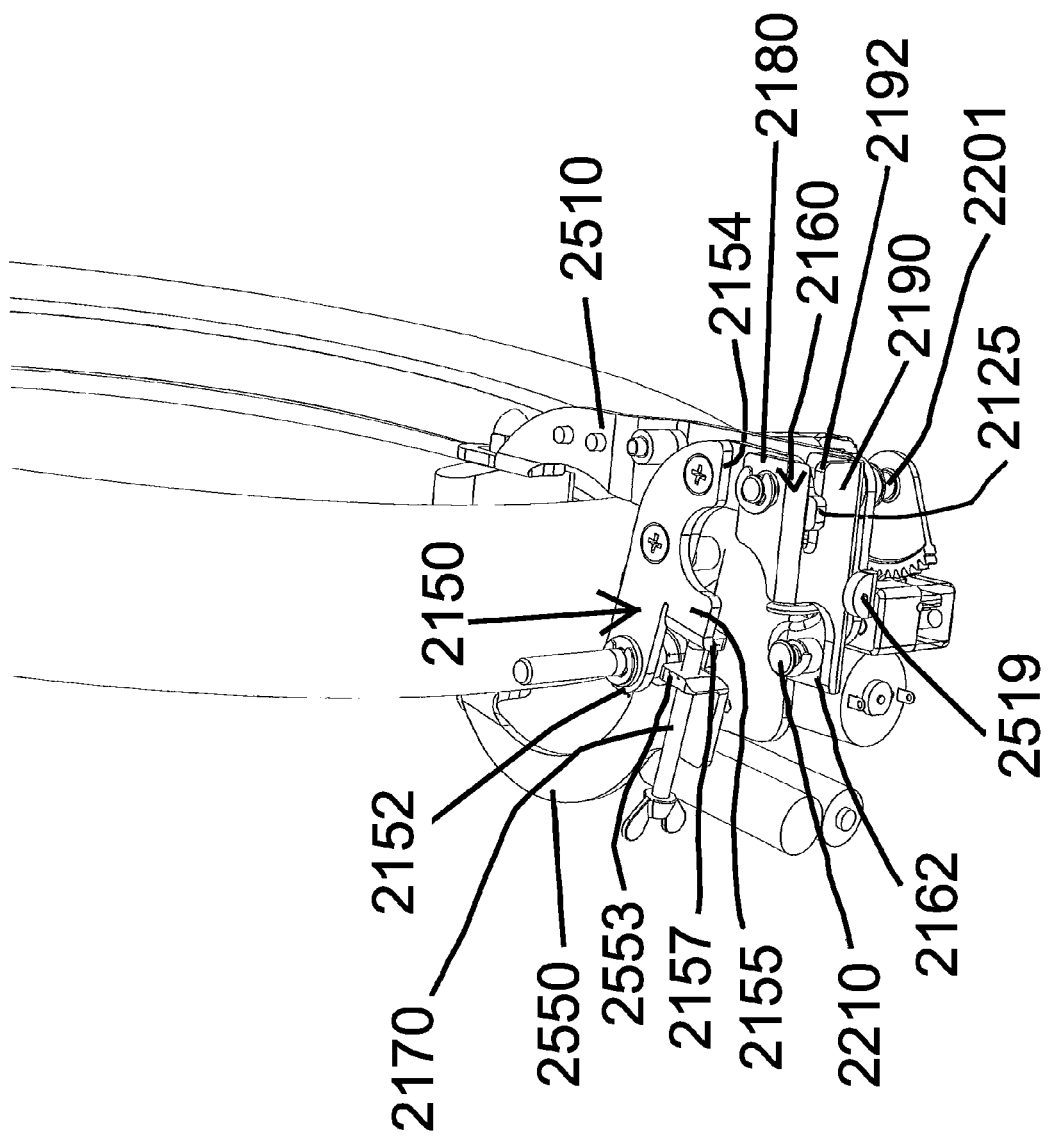
FIG. 18 is a perspective view of internal components of the device of FIG. 16.
Figure 19:
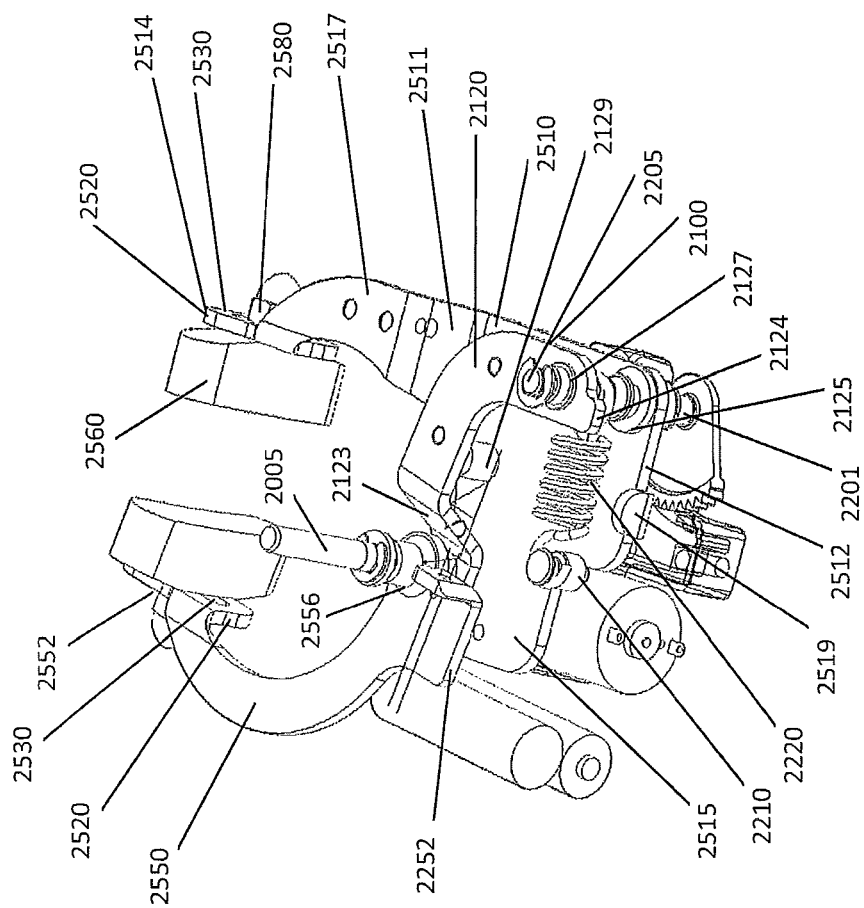
FIG. 19 is a perspective view of internal components of the device of FIG. 16.
Figure 20:
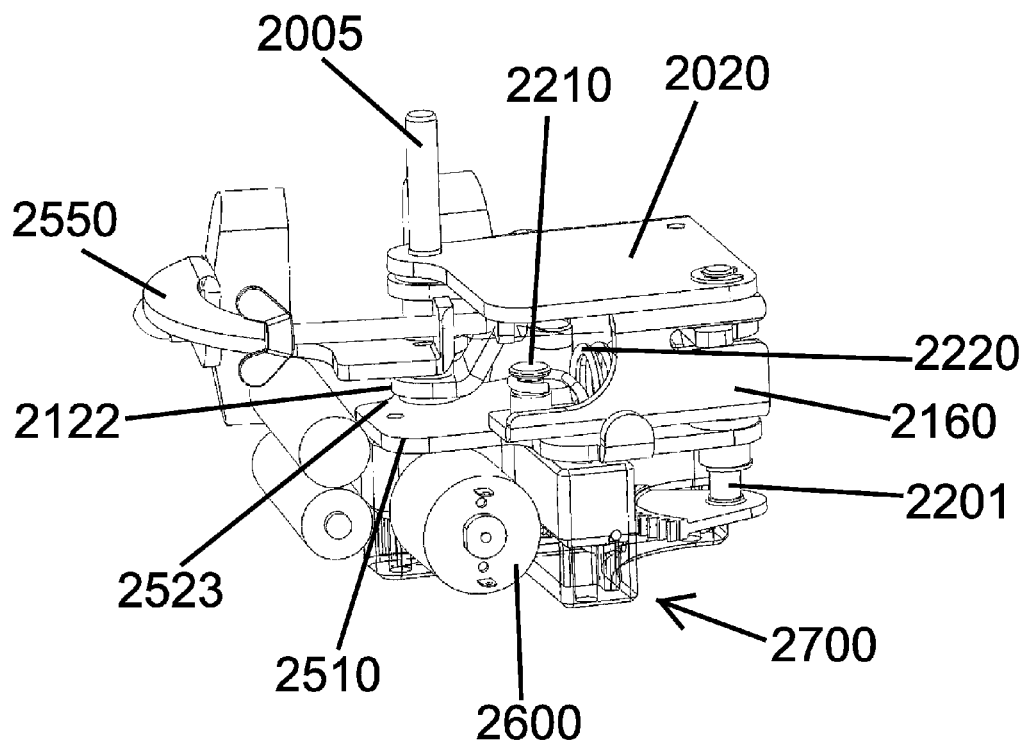
FIG. 20 is a perspective view of internal components of the device of FIG. 16.
Figure 21:
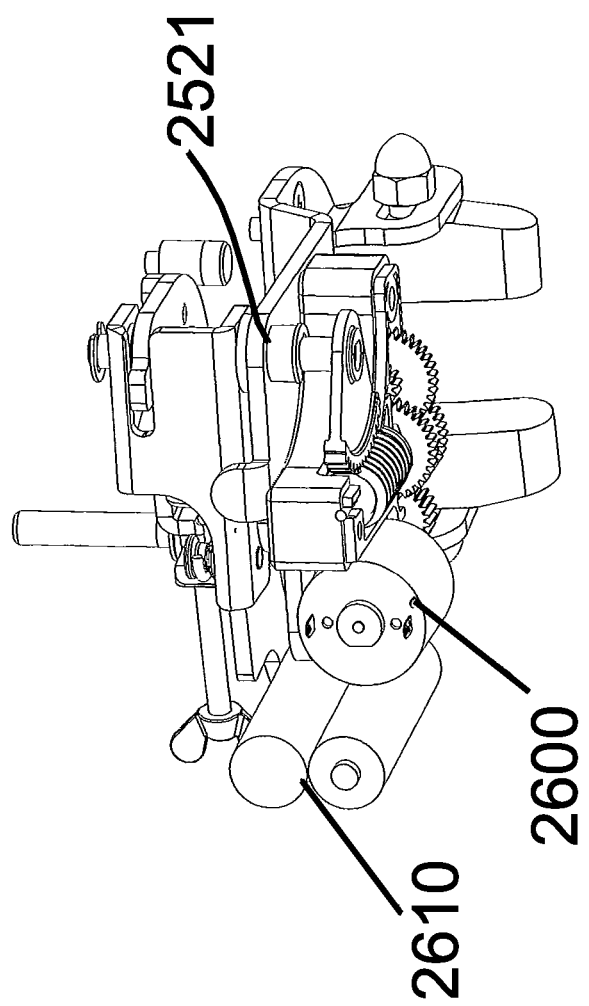
FIG. 21 is a perspective view of internal components of the device of FIG. 16.

As shown in FIG. 18, a second biasing arm 2150 is coupled to the first biasing arm 2150. The second biasing arm 2150 is disposed along one face (surface) of the first biasing member 2150 and more particularly, is disposed along one face of the second section of the first biasing arm 2150. The second biasing arm 2150 includes a first end 2152 and an opposing second end 2154 and has curved sections similar to the other components. At the first end 2152, an opening is formed to permit the pivot pin 2005 to pass through and thus the openings in the ends 2122, 2152 of the respective biasing arms 2120, 2150 are in registration.

The second biasing arm 2150 can be securely attached (mounted) to the first biasing arm 2120 using conventional means, including but not limited to using fasteners, as shown. The second biasing arm 2150 does not extend to the second end of the first biasing arm 2120.

Between the two ends 2152, 2154 of the second biasing arm 2150, an extension or finger 2155 is formed and extends radially outward. At the free end of the extension 2155, a downwardly directed flange 2157 is formed. The flange 2157 can be formed perpendicular to the main body of the second biasing arm 2150 and is in a location in which the first biasing arm 2120 is not located underneath. The flange 2157 is thus disposed generally adjacent a portion of the underlying first biasing arm 2120.

The flange 2157 is located generally across from the upstanding tab 2553 of the second caliper 2550. One feature of the device 2000 is the presence of an adjustment means and in particular, the adjustment means includes an elongated adjustment member 2170, such as a pin or rod or the like, that passes through the opening formed in the upstanding tab 2553 and can be driven into contact with the flange 2157. It will be appreciated that as the pin 2170 is driven into contact with the flange 2157 it applies a force thereto and this force is translated into an adjustment to the relative positions of the calipers as described herein. Any number of different pin 2170 structures can be used and the pins 2170 can have different types of heads, such as knobs or the like, to permit the user to easily rotate the pin 2170 to cause the pin 2170 to either be driven forward or rearward.

The pin 2170 operates so as to open or close the calipers 2510, 2550 and in particular, when the pin 2170 is driven inwardly into contact with the flange 2157 (which is in turn coupled to the first caliper 2510), the first caliper 2510 is moved relative to the second caliper 2550 due to the biasing mechanism and arm assemblies described herein.

The pin 2170 is used for initial installation and for fine tuning of the relative positions of the calipers 2510, 2550 since bikes come with different sized tires.

The device 2000 also includes an arm 2160. The arm 2160 includes a first section 2162, a second section 2180 that is spaced from and is generally parallel to the first section 2162, and a third section 2190 that extends between the first section 2162 and the second section 2180. The third section 2190 can thus represent a vertical wall. The third section 2190 has a slot 2192 formed therein, with the slot 2192 being open along an outer edge of the third section 2190. The slot 2192 is constructed such that the tab 2125 of the first biasing arm 2120 is received therein and permitted to travel therein during operation of the device 2000 as described herein.

Figure 26:
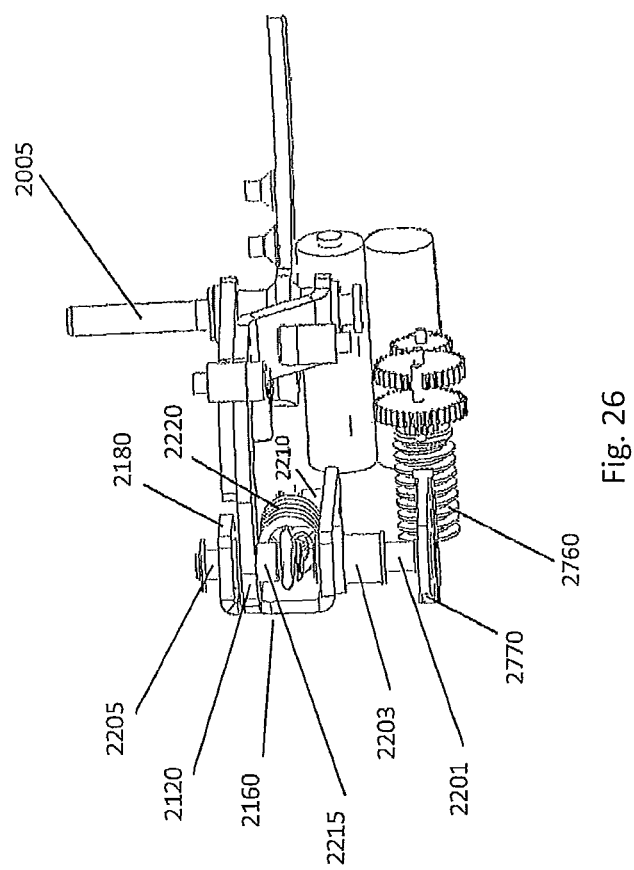
FIG. 26 is a perspective view of internal components of the device of FIG. 16.

The first section 2162 includes a number of openings formed therethrough to allow other components of the device to be coupled to the arm 2160. For example, the first section 2162 includes one opening near one edge that receives the pin 2170 and a through opening 2165 formed near another edge thereof. The second section 2180 includes a through opening 2182 that is axially aligned with the through opening 2127 to permit a first arm pivot 2201 to pass therethrough. As described herein, the first arm pivot 2201 is an elongated pin that coupled the arm 2160 to another structure as described herein and permits the arm 2160 to pivot about the first arm pivot 2201 and move with the first arm pivot 2201 are described below. As shown in FIG. 26, a bushing 2203 can be disposed along the first arm pivot 2201 below the section 2162 of the arm 2160. The first arm pivot 2201 passes through the opening 2521 of the first caliper 2510.

The device 2000 also includes a second arm pivot 2205 that passes through the opening 2127 formed in biasing arm 2120 and through the opening formed in the section 2180 of the arm 2160. The second arm pivot 2205 thus represents another pivot for attaching the section 2180 of the arm 2160 to the biasing arm 2120.

It will therefore be appreciated that the arm 2160 is pivotally attached at its section 2180 to the biasing arm 2120 and it similarly pivotally attached at its section 2162 to the first caliper 2510 and to a gear mechanism as described herein.

In one position (e.g., brake on position), the arm 2160 is disposed adjacent the tab 2519 that is formed along the rear edge of the first section 2515 of the first caliper 2510. The tab 2519 thus limits the degree of movement (pivoting movement) of the arm 2160.

A first spring anchor 2210 is provided and is coupled to the bottom section 2180 of the arm 2160. A second spring anchor 2215 is provided and is coupled to an underside of the first biasing arm 2120. For example, one end of each of the spring anchors 2210, 2215 can include a pin or the like that is received within the corresponding opening formed in the respective structure; namely, the arm 2160 and the first biasing arm 2120, thereby attaching the spring 2220 between two separate parts, namely the pivoting arm 2160 and the first biasing arm 2120.

The spring anchors 2210, 2215 are upstanding members that each has a continuous channel or groove formed therein for receiving one end of a biasing member 2220. As shown, the biasing member 2220 can be in the form of a spring and a hooked end thereof can be received within the groove for coupling the biasing member 2220 to the spring anchor 2210 and to the arm 2160.

One end of the second arm pivot 2205 also extends through the hole 2023 formed in the bracket 2020. The arm pivots 2201, 2205 thus define an axis that extends through the first caliper 2510, the arm 2160, the first biasing arm 2120, and the bracket 2020. As mentioned above, the various arm structures including the arms 2120, 2150, 2160 are disposed between the bracket 2020 and the first caliper 2510.

Figure 27:
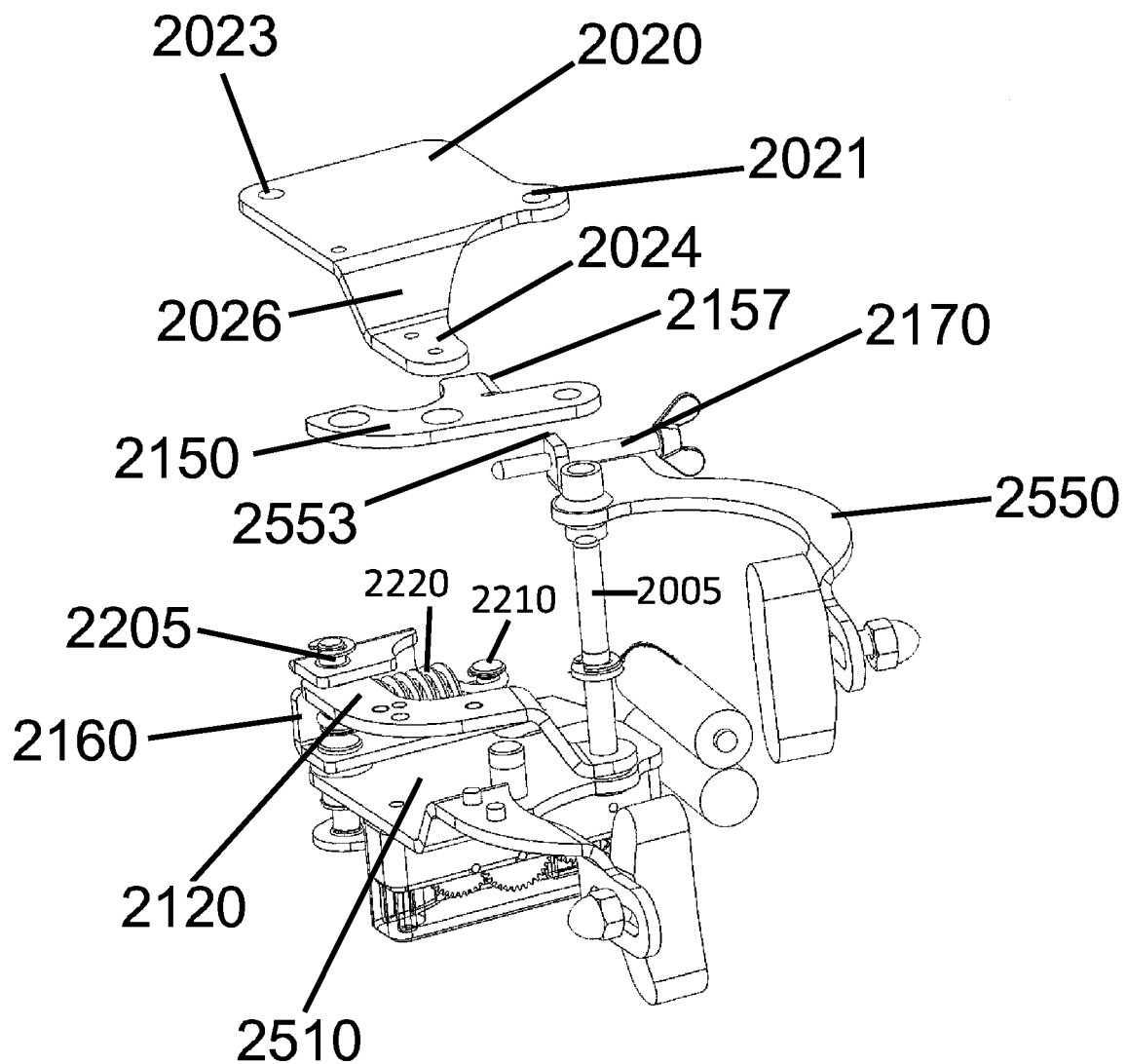
FIG. 27 is an exploded perspective view of internal components of the device of FIG. 16.
Figure 28:
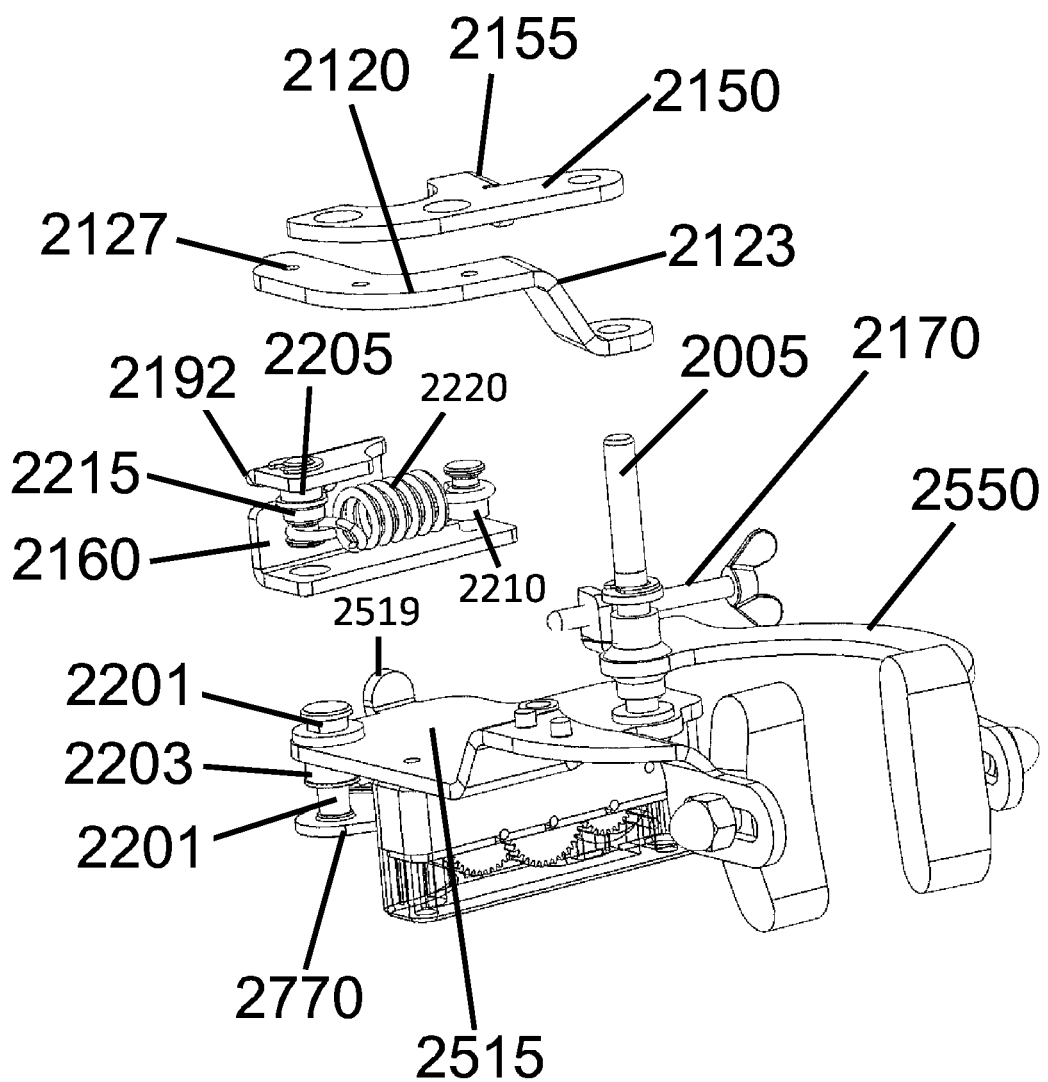
FIG. 28 is another exploded perspective view of internal components of the device of FIG. 16.

FIGS. 27 and 28 are exploded perspective views that show the various internal components of the caliper assembly 2500. As shown in FIGS. 27 and 28, the first biasing arm 2120, second biasing arm 2150, and the second caliper 2550 are all pivotably mounted to the main pivot 2005 as a result of the main pivot 2005 extending through aligned openings (holes) formed in each. As shown in FIG. 27, the second caliper 2550 carries the adjustment member 2170. As shown in the figures, the second biasing arm 2150 is disposed above the second caliper 2550 along the main pivot 2005 and the lower portion of the first biasing arm 2120 that is disposed about the main pivot 2005 is disposed below the portion of the second caliper 2550 that is disposed about the main pivot 2005. The second caliper 2550 can thus pivot between the ends of the first and second biasing arms 2120, 2150. The assembly of the arm 2160 is shown in FIG. 28 in exploded view relative to the first section 2515 of the first caliper 2510 to which it it rotatably mounted. As shown, the arm 2160 is rotatably mounted to the first caliper 2510 by means of the first arm pivot 2201 which extends through bushing 2203. As described below, the first arm pivot 2201 is connected to a movable part (a gear) that is driven in so as to cause rotation of the first arm pivot 2201.

The arm 2160 is also operatively coupled to the second arm pivot 2205 which couples a top portion of the arm 2160 to the bracket 2020. The second arm pivot 2205 extends through opening 2023 and thus defines another pivot axis about which the arm 2160. The pivot axis of the two pivots 2201, 2215 are thus along the same axis. This results in the arm 2160 pivoting about this axis as shown in the figures. As shown in the figures, the two biasing arms 2120, 2150 are coupled to one another (via fasteners) and are coupled to the main pivot 2005 and the arm 2160. The arms 2120, 2150 are not directly attached to the calipers. As described herein, the biasing arm 2120 is coupled to the arm 2160 by means of the second arm pivot 2205.

The device 2000 also includes a drive member 2600 and a gear mechanism 2700 for transferring the action of the drive member 2600 to the calipers 2510, 2550 to provide controlled movement thereof and move the calipers 2510, 2550 between the brake on and brake off positions.

Figure 22:
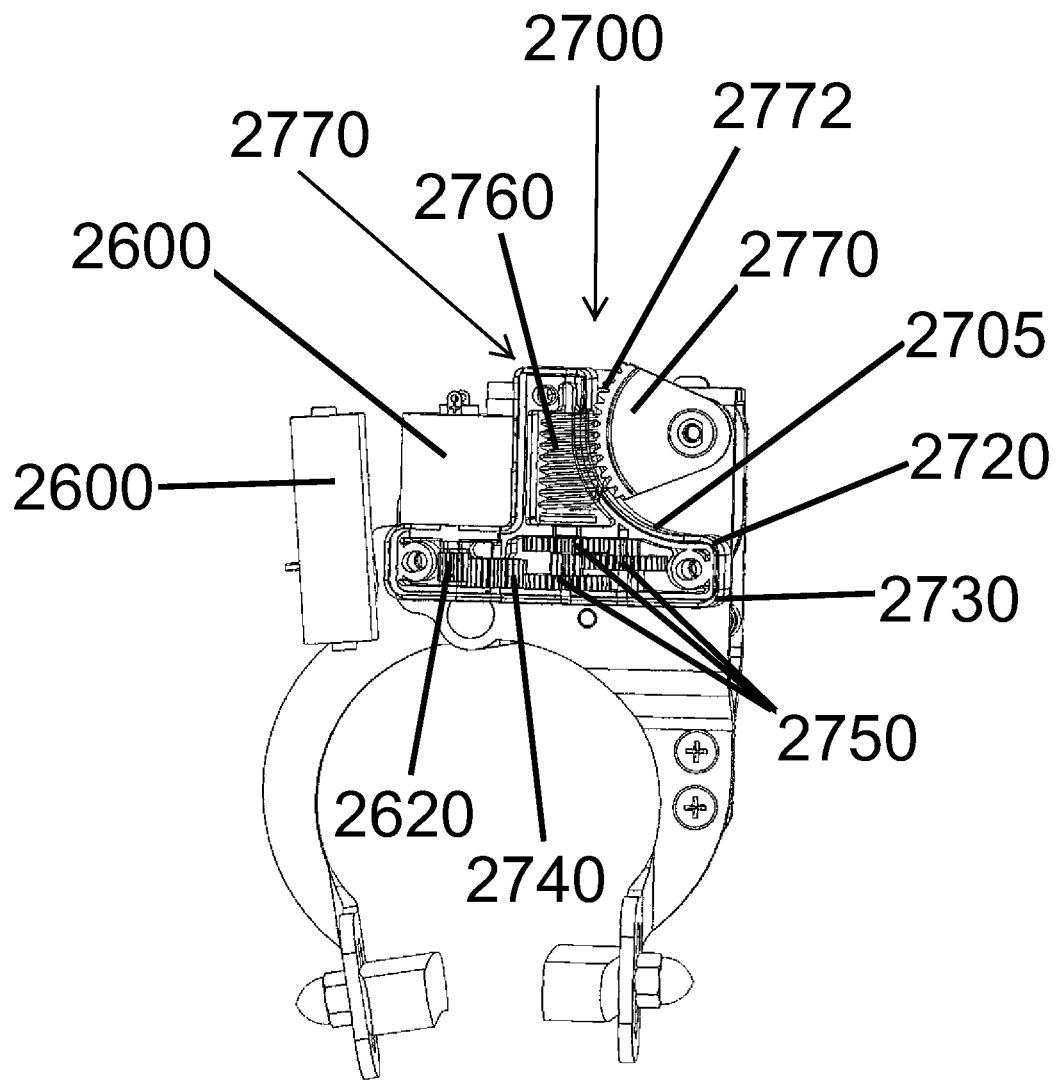
FIG. 22 is a perspective view of internal components of the device of FIG. 16.

The drive member 2600 is in the form of a motor, such as a stepper motor, that is powered by an energy source, such as batteries 2610. As shown in FIG. 22, the drive member (motor) 2600 includes a drive member in the form of a pinion 2620 that extend outwardly from the housing of the motor 2600 and is driven (rotated) under action of the energy source.

The drive member 2600 is mounted to a structure within the device 2000 and in particular, the drive member 2600 can be mounted to a gear box 2710 that is part of the gear mechanism 2700. The gear box 2710 includes a gear box bottom 2720 and a gear box top 2730. The gear box bottom 2720 can be mounted to one face of the first caliper 2510 using conventional means, such as fasteners. The drive member 2600 can be attached to the gear box 2710 as shown.

Within the gear box 2710 a plurality of gears are arranged so as to transfer action of the pinion 2620 into movement of the arm pivot 2201 which in turn is translated into movement of other parts. For example, the plurality of gears can include an idle gear 2740 that meshes with the pinion 2620 and a series of spur and compound gears 2750 that mesh with the idle gear 2740 and one another. In addition, the gear box 2710 includes a worm gear assembly that includes a worm 2760 that is operatively coupled to the gears 2750 as by a worm shaft or pin such that rotation of the gears 2750 causes rotation of the worm 2760. The gear box 2710 includes a window through which at least a portion of the worm 2760 is accessible. As shown in the figures, the gear box 2710 can include an arcuate section 2705 and the window is formed within this section 2705.

The arm pivot 2201 is fixedly coupled to a worm gear 2770. Thus, when the worm gear 2770 is driven as a result of movement of the worm 2760 and the other gears under power of the motor, the arm pivot 2201 moves. The arm pivot 2201 thus represents a moving pivot since the arm pivot 2201 is coupled to the worm gear 2770 and the driving action of the worm gear 2770 causes the arm pivot 2201 to move as a result of the action of the worm.

As shown in FIG. 22, the worm gear 2770 is pie shaped and has teeth 2772 formed along an inner edge thereof. The teeth 2772 mesh with the worm 2760 such that rotation of the worm 2760 causes the worm gear 2770 to pivot about an axis that extends through the arm pivot 2201. Depending upon which way the worm 2760 is driven, the worm gear 2770 moves in the respective direction and this movement is translated into movement of the arm pivot 2201 rotating in either a clockwise direction or a counterclockwise direction.

Figure 23:
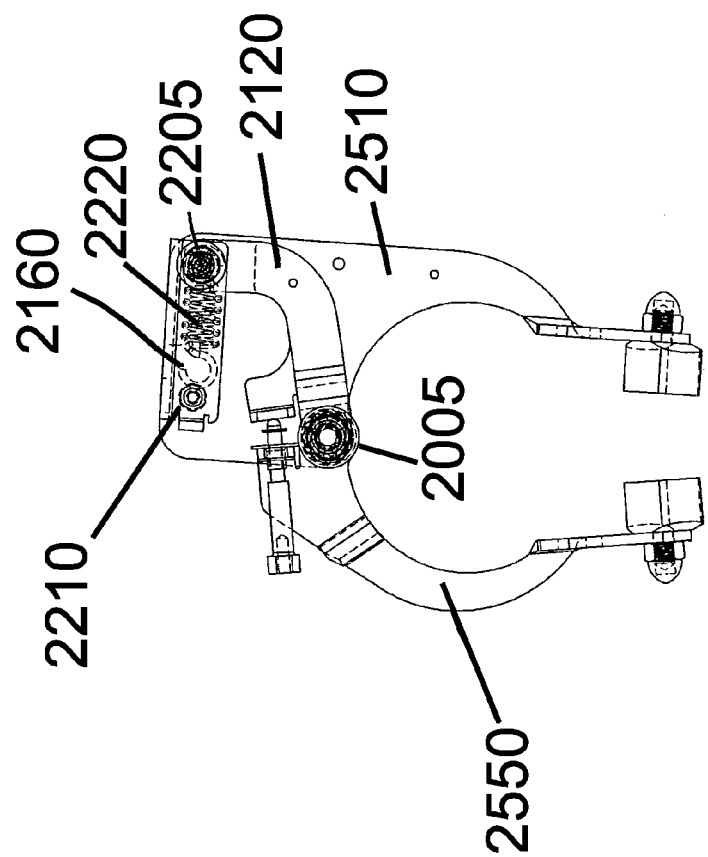
FIG. 23 is a top plan view of the calipers and other components in a brake on position.
Figure 24:
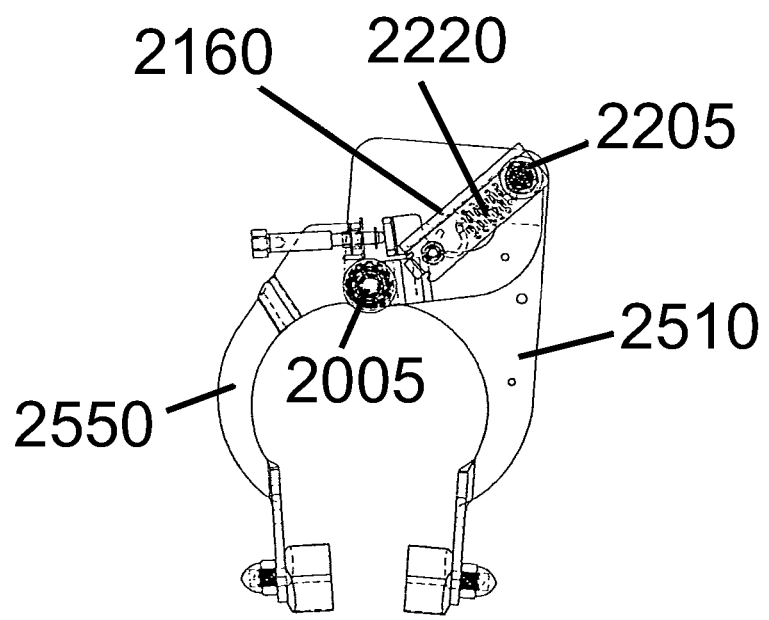
FIG. 24 is a top plan view of the calipers and other components in a brake off position.
Figure 25:
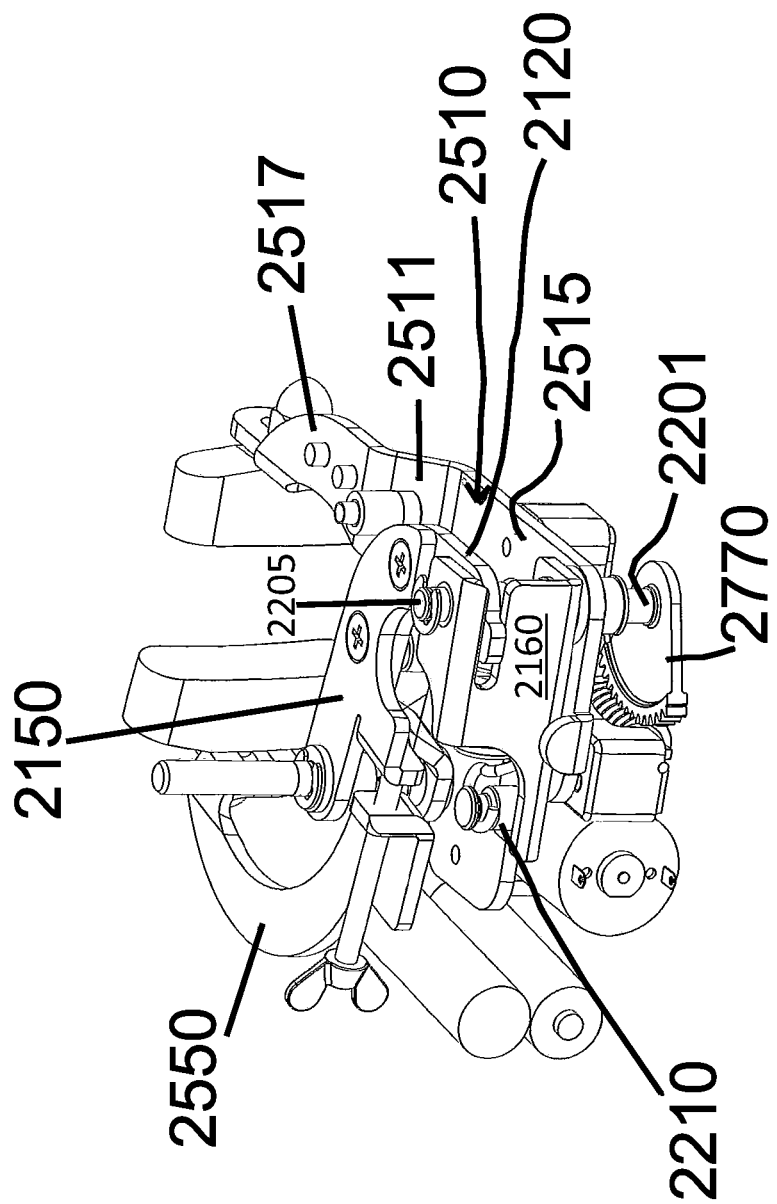
FIG. 25 is a perspective view of internal components of the device of FIG. 16.

The arm 2160 is pivotally coupled to the first arm pivot 2201 such that it pivots thereabout and pivots relative to the first and second biasing members 2120, 2150. As shown in FIGS. 23-24, the arm 2160 assumes a different position in the brake on position compared to the brake off position. In particular, the arm pivot 2201 is disposed between movable components that are directly coupled the first caliper 2510 and similarly, the second pivot 2205 is also coupled to components that are directly attached to the first caliper 2510 and the spring anchor 2210 is also attached to a component (biasing arm 2120) that is attached to the first caliper 2510. Therefore, the biasing force 2220 of the spring causes movement of the first caliper 2510 as a result of its direct coupling to the spring arm 2120 and the arm 2160 and when select conditions occur as described below.

The spring 2220 exerts a biasing force that causes the arm 2160 to pivot about the arm pivot 2201 and depending upon the orientation of the spring 2220 (the arm 2160) and the main pivot 2205, the spring force will either cause the arm 2160 to be driven into one of two position, namely, the brake on position or the brake off position.

In particular, the present invention utilizes an over-center spring mechanism. Over-center spring mechanisms are typically used to mechanically hold a pivoting structure in selected resting positions relative to a pivot point. These mechanisms often include a tension spring that is attached at one end to a fixed structure, and at the other end is attached to the pivoting structure. The position of the spring is such that the spring extends over the pivot point of the pivoting structure at some point during the range of motion of the pivoting structure. The greatest spring force is experienced at a point where the spring applies no moment to the pivoting structure, thus basing the structure away from the midpoint of its motion. The force and motion characteristics of conventional over-center spring mechanisms relate to the strength and size of the spring, the position of its attachment to the pivoting structure, and other intervening structure that may be involved in the mechanism.

In the brake on position shown in FIG. 23, the spring 2220 is in an extended condition (storing energy), while in the brake off position shown in FIG. 24, the spring 2220 is in a compressed condition (rest position). The pivoting of the arm 2160 causes the relative positions of the spring anchors to change and thus the length of the spring changes. For example, when the arm 2160 moves to the position of FIG. 23 (brake on), the distance between the spring anchors is greater than the distance between the spring anchors in FIG. 24 (brake off) resulting in the spring having a greater length in FIG. 23.

In the brake on position of FIG. 23, the biasing force is such that the arm 2160 is seated against the tab 2519. However, in the brake off position shown in FIG. 24, the arm 2160 pivots due to operation of the biasing member 2220 and is spaced from the tab 2519. As shown in FIGS. 23-24, in the brake off position, an axis that extends through the spring 2220 intersects the main pivot 2005, while in the brake on position, the axis that extends through the spring 2220 does not intersect the main pivot 2005. As described above, this arrangement provides an over-centered spring mechanism to cause movement of the calipers between a brake on and a brake off position.

In the brake on position, the tab 2124 of the biasing arm 2120 is located in an intermediate position in slot 2192 of the arm 2160 as shown in the figures, while in the brake off position, the location of the tab 2124 in the slot 2192 is different and the relationship between the tab 2124 and slot 2192 acts as a means for moving the spring arm 2120. In other words, as the arm 2160 pivots about the arm pivots 2201, 2205, the arm 2160 is driven into contact with tab 2124 of the biasing arm 2120 and continued pivoting of the arm 2160 is directly translated into movement of the spring arm 2120. The movement of the arm 2160 is assisted by the changing moment of the biasing force due to the over-centered nature of the spring, thereby causing the desired pivoting movement of the arm 2160 which in turn causes movement of the first biasing arm 2120 and due to the moving nature of the second arm pivot 2205, the movement of the first biasing arm 2120 is translated into movement of the calipers in an outward direction about the main pivot 2005, thereby opening the brake.

It will be appreciated that in one embodiment, the second arm pivot 2205 thus represents a moving pivot as well as the first arm pivot 2201.

The movement of the arm pivots 2201, 2205 from the brake off position to the brake on position results in the arm pivots 2201, 2205 moving in a direction away from the main pivot 2005 and this results in the first and second biasing arms 2120, 2150 pivoting about the main pivot 2005 such that a distance between the pivots 2201, 2005 increases and this causes the second caliper 2550 to pivot inward toward the first caliper 2510 resulting in the brake pads thereof being brought into intimate engagement with the tire 30 so as to cause a braking action. As mentioned herein, when the brake is activated, the activation of the motor causes pivoting of the arm 2160 from the position of FIG. 24 to the position of FIG. 23 and this in effect pulls the second caliper toward the tire and the caliper pivots about the main pivot 2005. The arm 2160 can only travel to the position where it contacts the tab 2519 which acts as a stop and limits the movement of the arm 2160.

To release the brake, the motor and gear action is reversed and this causes the arm 2160 to move (pivot) in the opposite direction and the biasing force 2220 exerts a force on the arm 2160 to cause the arm 2160 to move in a direction toward the main pivot 2205. As described above, the movement of the arm 2160 from the brake on position to the brake off position causes the arm 2160 to be driven into contact with the first biasing arm 2120 which can move since is attached to the arm 2160 and to the spring anchor 2215 and at the other end to the main pivot 2005.

As this occurs, the arm pivots 2201, 2205 move down toward the main pivot 2005, thereby causing the second caliper 2550 to pivot outward and thus cause the brake pad to move away from the tire 30.

As with the other embodiments disclosed herein, the device 2000 is designed to be controlled wirelessly as by using a remote control unit.

It will be appreciated that the biasing mechanism is designed such that a biasing force is applied to the arms and the direction of the biasing force is variable in accordance with the present invention. The pivot point that is defined by arm pivots 2201, 2205 is a moving pivot point and this permits the applied direction of the biasing force to vary and due to the over-centered spring mechanism arrangement of the present invention, the movements of the arm pivots 2201, 2205 is translated into movement of the arm 2160 to either the brake off position or the brake on position depending upon the manner in which the motor and gears are operated. The tension spring of this over-centered spring mechanism arrangement thus controls movement of the arm 2160.

While the invention has been described in connection with certain embodiments thereof, the invention is capable of being practiced in other forms and using other materials and structures. Accordingly, the invention is defined by the recitations in the claims appended hereto and equivalents thereof.

What is claimed is:

1. An electronic brake device for use with a wheel of a bicycle, comprising:
   a housing;
   a first brake caliper having a first end and a second end that contains a brake pad;
   a second brake caliper having a first end and second end that contains a brake pad, the first and second brake calipers being pivotally coupled to one another about a main pivot that is a fixed pivot;
   an electric motor disposed within the housing and being mounted to the first brake caliper;
   a first gear driven by the electric motor;
   a gear mechanism that is intimately coupled to the first gear and includes a plurality of gears that are driven by operation of the motor;
   a pivot arm assembly that is coupled to the main pivot and to a secondary pivot that is operatively coupled to the gear mechanism such that operation of the gear mechanism causes the secondary pivot to move, the pivot arm assembly having a biasing mechanism which applies a force to at least one component of the pivot arm assembly to cause movement thereof, the movement of the at least one component being translated into movement of the calipers between a brake on position in which the brake pads are in contact with the tire to prevent movement thereof and a brake off position in which the brake pads are spaced from the tire to allow movement thereof, wherein the at least one component comprises a pivot arm that pivots about the secondary pivot and the biasing mechanism includes a spring that is attached at one end to the pivot arm and at an opposite end to a first spring arm that is pivotally attached at a first end to the secondary pivot and is pivotally attached at a second end to the fixed main pivot; and
   a circuit that is configured to receive a remote command signal and activate the electric motor.

2. The electronic brake device of claim 1, wherein the first gear comprises a worm gear that meshes with a worm that is operatively coupled to gear mechanism such that movement of the gear mechanism under action of the motor is translated into movement of the worm.

3. The electronic brake device of claim 1, wherein the first spring arm is disposed on a top surface of the first caliper and along at least a length thereof, the first spring arm is spaced above the top surface by one or more spacers.

4. The electronic brake device of claim 1, wherein the secondary pivot comprises a first arm pivot and a second arm pivot, the first arm pivot pivotally coupling a top section of the pivot arm to the first spring arm, the second arm pivot pivotally connecting a bottom section of the pivot arm to the first caliper.

5. The electronic brake device of claim 4, wherein the first arm pivot pivotally couples a top section of the pivot arm to the first spring arm and the second arm pivot pivotally attaches a bottom section of the pivot arm to the first caliper, wherein the pivot arm includes a side section that extends between the top section and the bottom section and includes a slot that receives a tab that is part of the first spring arm and is located at the first end thereof, the slot accommodating pivoting movement of the pivot arm relative to the first spring arm such that movement of the pivot arm drives movement of the first spring arm.

6. The electronic brake device of claim 5, wherein a peripheral edge of the first caliper includes an upstanding stop that limits travel of the pivot arm and in the brake-on position, the pivot arm seats against the stop.

7. The electronic brake device of claim 4, wherein the second arm pivot is fixedly attached to the first gear and therefore movement of the first gear is translated into movement of the second arm pivot and movement of the pivot arm.

8. The electronic brake device of claim 4, wherein the first and second arm pivots define an axis of the secondary pivot that extends through the first caliper, the pivot arm and the first spring arm and the housing.

9. The electronic brake device of claim 1, wherein the spring comprises a tension spring that has a first end section that attached to a first spring anchor that is fixedly attached to the pivot arm and a second spring anchor that is fixedly attached to first spring arm.

10. The electronic brake device of claim 1, wherein both the fixed main pivot and the secondary pivot pass through the first spring arm.

11. The electronic brake device of claim 1, wherein the pivot arm assembly further includes a second spring arm that is fixedly attached to the first spring arm and is pivotally coupled to the main pivot, the second spring arm having an extension that is spaced across from an upstanding tab that is formed as part of the second caliper, wherein a caliper adjustment member passes through an opening in the tab and moves transversely relative to the tab and is configured to assume different stationary positions relative to the tab, the caliper adjustment member having a distal end that contacts the extension for manually adjusting the position of the second caliper relative to the first caliper by causing the second caliper to pivot about the main pivot.

12. The electronic brake device of claim 1, wherein the gear mechanism is mounted to an underside of the first caliper.

13. An electronic brake device for use with a wheel of a bicycle, comprising:
a housing;
a first brake caliper having a first end and a second end that contains a brake pad;
a second brake caliper having a first end and second end that contains a brake pad, the first and second brake calipers being pivotally coupled to one another about a main pivot that is a fixed pivot;
an electric motor disposed within the housing and being mounted to the first brake caliper;
a first gear driven by the electric motor;
a gear mechanism that is intimately coupled to the first gear and includes a plurality of gears that are driven by operation of the motor;
a pivot arm assembly that is coupled to the main pivot and to a secondary pivot that is operatively coupled to the gear mechanism operation of the gear mechanism causes the secondary pivot to move, the pivot arm assembly having a biasing mechanism which applies a force to at least one component of the pivot arm assembly to cause movement thereof, the movement of the at least one component being translated into movement of the calipers between a brake on position in which the brake pads are in contact with the tire to prevent movement thereof and a brake off position in which the brake pads are spaced from the tire to allow movement thereof, wherein the at least one component comprises a pivot arm that pivots about the secondary pivot and the biasing mechanism includes a spring that is attached at one end to the pivot arm and at an opposite end a first spring arm that is pivotally attached at a first end to the secondary pivot and is pivotally attached at a second end to the fixed main pivot; and
a circuit that is configured to receive a remote command signal and activate the electric motor;
wherein the biasing mechanism comprises the spring and wherein in the brake off position a longitudinal axis of the spring intersects the main pivot, while in the brake on position the longitudinal axis of the spring is displaced from the main pivot.

14. The electronic brake device of claim 13, wherein the at least one component comprises a pivot arm that pivots about the secondary pivot, the spring being attached at one end to a first anchor that is attached to the pivot arm and at an opposite end to a first spring arm that is pivotally attached at a first end to the secondary pivot and is pivotally attached at a second end to the fixed main pivot, wherein the secondary pivot comprises first and second arm pivots, the first arm pivot pivotally coupling a top section of the pivot arm to the first spring arm, the second arm pivot coupling a bottom section of the pivot arm to the first caliper.

15. The electronic brake device of claim 14, wherein a second anchor is provided on an underside of the first spring arm, whereby the spring is attached between the pivot arm and the first spring arm.

16. An electronic brake device for use with a wheel of a bicycle, comprising:
a housing;
a first brake caliper having a first end and a second end that contains a brake pad;
a second brake caliper having a first end and second end that contains a brake pad, the first and second brake calipers being pivotally coupled to one another about a main pivot that is a fixed pivot;
an electric motor disposed within the housing and being mounted to the first brake caliper;
a first gear driven by the electric motor;
a gear mechanism that is intimately coupled to the first gear and includes a plurality of gears that are driven by operation of the motor;
a pivot arm assembly that is coupled to the main pivot and to a secondary pivot that is operatively coupled to the gear mechanism such that operation of the gear mechanism causes the secondary pivot to move, the pivot arm assembly having a biasing mechanism which applies a force to at least one component of the pivot arm assembly to cause movement thereof, the movement of the at least one component being translated into movement of the calipers between a brake on position in which the brake pads are in contact with the tire to prevent movement thereof and a brake off position in which the brake pads are spaced from the tire to allow movement thereof, wherein the at least one component comprises a pivot arm that pivots about the secondary pivot and the biasing mechanism includes a spring that is attached at one end to the pivot arm and at an opposite end to a first spring arm that is pivotally attached at a first end to the secondary pivot and is pivotally attached at a second end to the fixed main pivot; and a circuit that is configured to receive a remote command signal and activate the electric motor;

wherein the first spring arm includes a tab and the pivot arm includes a slot that receives the tab, wherein in the brake on position, the tab is in a first location within the slot and in the brake off position, the tab is in a different second location within the slot, whereby pivoting of the pivot arm causes a driving of the first spring arm due to contact between the tab and the pivot arm which results in movement of the second caliper relative to the first caliper.

* * * * *